(12) United States Patent
Wang et al.

(10) Patent No.: US 8,290,038 B1
(45) Date of Patent: Oct. 16, 2012

(54) VIDEO CODING COMPLEXITY ESTIMATION

(75) Inventors: Huisheng Wang, Palo Alto, CA (US);
Xiaoquan Yi, Mountain View, CA (US);
Vijnan Shastri, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 12/627,673

(22) Filed: Nov. 30, 2009

(51) Int. Cl.
*H04N 7/12* (2006.01)
*H04N 11/02* (2006.01)
*H04N 7/32* (2006.01)

(52) U.S. Cl. .......... 375/240.02; 375/240.03; 375/240.12

(58) Field of Classification Search ............. 375/240.02, 375/240.03, 240.26
See application file for complete search history.

(56) References Cited

U.S. PATENT DOCUMENTS

| | | | | |
|---|---|---|---|---|
| 5,929,914 A | * | 7/1999 | Normand | 375/240.04 |
| 6,181,742 B1 | * | 1/2001 | Rajagopalan et al. | 375/240 |
| 6,647,061 B1 | * | 11/2003 | Panusopone et al. | 375/240.12 |
| 2002/0136295 A1 | * | 9/2002 | Sato | 375/240.03 |
| 2004/0156438 A1 | * | 8/2004 | Choi | 375/240.25 |
| 2005/0180502 A1 | * | 8/2005 | Puri | 375/240.03 |
| 2011/0002381 A1 | * | 1/2011 | Yang et al. | 375/240.03 |

* cited by examiner

*Primary Examiner* — Joseph Ustaris
*Assistant Examiner* — On S Mung
(74) *Attorney, Agent, or Firm* — Fenwick & West LLP

(57) ABSTRACT

A system and method estimates video coding complexity of a source video for adaptively transcoding the source video. A video coding complexity engine of the system is configured to receive the source video in its native format and to encode the source video into an intermediate video format. The video coding complexity engine computes a video coding complexity score for the source video. The coding complexity score can be used by an adaptive bitrate transcoding sub-system and/or an adaptive resolution transcoding sub-system for transcoding the source video.

20 Claims, 14 Drawing Sheets

VIDEO CODING COMPLEXITY ESTIMATION

BACKGROUND OF THE INVENTION

The present invention relates generally to video hosting systems, and more particularly to a video coding system for adaptive transcoding of videos based on video coding complexity.

BACKGROUND

Video hosting services, such as YOUTUBE, allow users to post videos. Most video hosting services transcode an original source video from its native encoded format (e.g., MOV) into a commonly available format (e.g., ADOBE FLASH or Windows Media Video (WMV)). Transcoding comprises decoding the source video from the native format into an unencoded representation using a codec for the native format and then encoding the unencoded representation with a codec for the commonly available format. Transcoding can be used to reduce storage requirements, and also to reduce the bandwidth requirements for serving the video to clients.

One challenge in designing a video coding system for video hosting services with millions of videos is to transcode and to store the videos with acceptable visual quality and at a reasonable computing cost. A particular problem is the efficient allocation of coding bits to achieve an optimized rate-distortion (R-D) of a source video. Generally, given a target resolution and frame rate, a video's visual quality is determined by its encoding bitrate computed using a rate control algorithm. Conventional video coding systems use traditional rate control algorithms to optimize the allocation of available coding bits within a single video sequence. However, given a large video corpus, in addition to the problem addressed by the traditional rate control algorithms, another problem is how to optimize the allocation of coding bits among different videos. Coding each video with same target resolution and video frame rate does not necessarily produce acceptable video quality in every case. A same encoding bitrate applied to two different videos having content of different complexity leads to different video qualities. A coding bitrate applied to one particular video cannot accurately represent average bitrate of the video corpus. Using a fixed encoding bitrate to encode source videos with varying video content deteriorates visual quality processed by a conventional video coding system for video hosting services.

Another aspect of the challenge in designing the video coding system is resolution transcoding with optimal visual quality. Conventional video transcoders specify a fixed resolution with a target bit rate and encode source videos with a variety of coding parameters (e.g., resolution, frame rate, bitrate) and content to output videos with the fixed resolution. However, conventional video transcoders ignore the impact of video content and coding complexity on transcoding. For example, a large number of user-contributed videos contain simple content, such as slide shows and talking heads with very little motion in the videos. Encoding these simple videos with a fixed small resolution degrades video quality and user experience.

SUMMARY

A method, system and computer program product provides adaptive transcoding of videos based on video coding complexity for video hosting services.

In one embodiment, the adaptive transcoding system comprises a video coding complexity engine, a video rate-distortion modeling engine, an adaptive bitrate transcoding sub-system and an adaptive resolution transcoding sub-system. The video coding complexity engine is configured to generate a measure of the video coding complexity of a source video. The video coding complexity measure represents a measure of how complicated it is to encode the source video. The video rate-distortion modeling engine is configured to estimate a rate-distortion (R-D) model and a scaling model for the adaptive transcoding system. The R-D model and scaling model are statistical models trained on a video corpus of the adaptive transcoding system using the video coding complexity information for the videos in the corpus. The adaptive bitrate transcoding sub-system applies the trained R-D model and scaling model to a source video and transcodes a source video with an optimized bitrate and visual quality based on the video coding complexity of the source video. The adaptive resolution transcoding sub-system transcodes a source video with an optimized resolution and visual quality based on the video coding complexity of the source video.

In another embodiment, the adaptive transcoding method receives a source video from client for a video hosting service. The adaptive transcoding method measures the video coding complexity of the source video and provides the video coding complexity measure of the source video to one or more adaptive video transcoders for further processing. The adaptive transcoding method generates a R-D model and scaling model using the video corpus and video coding complexity information for the videos in the corpus. The adaptive video coding method applies the R-D model and the scaling model to the source video based on the video coding complexity measure of the source video and transcodes the source video with an optimized bitrate and visual quality. The adaptive video coding method determines an optimal resolution for the source video based on the video coding complexity measure of the source video and transcode the source video with an optimized resolution and visual quality.

A video coding complexity engine of an adaptive transcoding system generates a measure of the coding complexity of a source video. In one embodiment, the video coding complexity of a source video is proportional to the amount of spatial and motion information contained in the video. The video coding complexity engine is configured to receive a source video in its native format and to encode the video from its native format into an intermediate format. The video coding complexity engine extracts spatial and temporal video features at the frame level, and transforms the frame level video features into features representing the source video as a whole. The video coding complexity engine selects a subset of video features, normalizes selected video features and scales the normalized video features for the coding complexity computation. Based on the normalized and scaled video features, the video coding complexity engine computes a video coding complexity score for the source video. The coding complexity score is used by an adaptive bitrate transcoding sub-system and/or an adaptive resolution transcoding sub-system for transcoding the source video.

In another embodiment, a video coding complexity measurement method receives a source video in its native format and encodes the source video into an intermediate format. The complexity measurement method extracts video features of the source video, normalizes and scales selected video features. The complexity measurement method further computes a video coding complexity score for the source video based upon the video feature information.

In one embodiment, the video rate-distortion modeling engine is configured to select a set of videos from a video corpus of a video hosting service and to encode the selected set of videos at multiple bitrates, resolutions and frame rates. From the plurality of encoded videos, the video rate-distortion modeling engine collects a plurality of rate-distortion coding data, and trains a rate-distortion model and a scaling model based on the collected rate-distortion coding data. A rate-distortion model defines a relationship between a quantization step size and a bitrate for a video being coded. A scaling model directs adjustment of the bitrate of a video calculated by the rate-distortion model given a frame rate and/or resolution of the transcoded video. To determine the optimized target bitrate of a video in the video corpus for a given visual quality, the trained rate-distortion model and the scaling model are applied to all videos in the corpus of the video hosting service. The trained rate-distortion model and the scaling model are used in conjunction with a video coding complexity engine and an adaptive bitrate transcoding sub-system to transcode a source video with an optimized bitrate and visual quality based on the video coding complexity measure of the source video.

In another embodiment, a R-D modeling method selects a set of videos from a video corpus of an adaptive transcoding system and encodes the selected set of videos at multiple bitrates, resolutions and frame rates. The R-D modeling method collects multiple pairs of R-D data from the encoding. The R-D data pairs describe a relationship between the bitrate of an encoded source video and the distortion of reconstructed source video, so as to provide a model of how the distortion of the reconstructed source video varies with the bitrate of the encoded source video. Based on the collected R-D data, the R-D modeling method estimates a R-D model and a scaling model for encoding the videos of the video corpus.

An adaptive bitrate transcoding sub-system transcodes a source video with an optimized bitrate and visual quality based on the video coding complexity of the source video and the R-D model and scale model provided by the rate-distortion modeling engine. The adaptive bitrate transcoding sub-system is configured to receive a source video and to obtain the video coding complexity score from a video coding complexity engine and an expected target video coding quality (e.g., indicated by a target quantization step size) of the source video. The adaptive bitrate transcoding sub-system calculates an initial target bitrate of the source video based on the video coding complexity score and the target quantization step of the source video using the R-D model. The adaptive bitrate transcoding sub-system uses the scale model to adjust the calculated initial target bitrate with respect to the resolution and/or the frame rate of the transcoded video. The adaptive bitrate transcoding sub-system transcodes the source video using the adjusted initial target bitrate.

An adaptive bitrate transcoding method receives a source video and obtains the video coding complexity of the source video. The bitrate transcoding method applies the trained R-D model to the source video to calculate an initial target bitrate of the source video based on the video coding complexity. The bitrate transcoding method further adjusts the initial target bitrate with respect to the resolution and/or frame rate of the transcoded video. The adaptive bitrate transcoding method transcodes the source video with the adjusted target bitrate.

An adaptive resolution transcoding sub-system transcodes a source video with an optimized resolution and visual quality based on the video coding complexity of the source video. The adaptive resolution transcoding sub-system is configured to receive a source video in its native format. The adaptive resolution transcoding sub-system obtains the video coding complexity score of the source video and video coding parameters (e.g., content header information) of the source video from a video coding complexity engine and sets a resolution adjustment level based on the complexity score. Based on the resolution adjustment level, the adaptive resolution transcoding sub-system determines an optimal output resolution for the source video for each video output format supported by the adaptive resolution transcoding sub-system. The optimal output resolution represents the most suitable resolution to transcode the source video based on its coding parameters such as content complexity and its native resolution. Responsive to a user selection of video output format, the adaptive resolution transcoding sub-system determines an optimal output resolution for the source video and encodes the source video with the determined optimal output resolution.

In another embodiment, the adaptive resolution transcoding method receives a source video from a client and obtains the video coding complexity score and video coding parameters (such as content header) of the source video. For each video output format, the adaptive resolution transcoding method sets a resolution adjustment level and determines an optimal output resolution for the source video. Responsive to a user selection of a video output format, the adaptive resolution transcoding method selects an optimal resolution for the source video and encodes the source video with the optimal output resolution for the selected video output format The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

I. System Overview

Figure 1A:
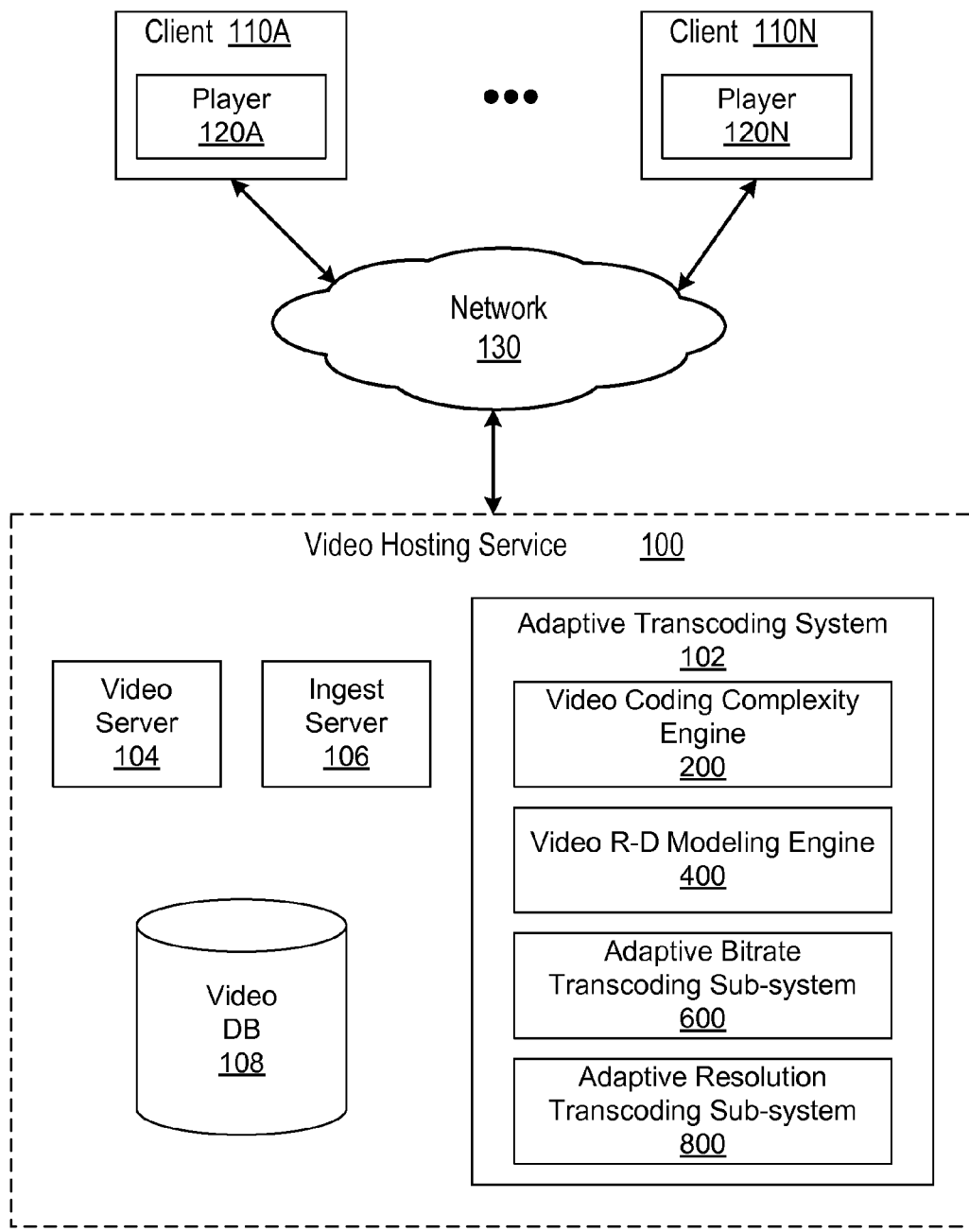
FIG. 1A is a block diagram illustrating a system view of a video hosting service having an adaptive transcoding system based on video coding complexity measurement.

FIG. 1A is a block diagram illustrating a system view of a video hosting service 100 having an adaptive transcoding system 102 based on video coding complexity measurement. Multiple users/viewers use client 110A-N to send video hosting requests to the video hosting service 100, such as uploading videos to a video hosting website, and receive the requested services from the video hosting service 100. The video hosting service 100 communicates with one or more clients 110A-N via a network 130. The video hosting service 100 receives the video hosting service requests from clients 110A-N, transcodes source videos by the adaptive transcoding system 102 and returns the transcoded source videos to the clients 110A-N.

Turning to the individual entities illustrated on FIG. 1A, each client 110 is used by a user to request video hosting services. For example, a user uses a client 110 to send a request for uploading a video for sharing, or playing a video. The client 110 can be any type of computer device, such as a personal computer (e.g., desktop, notebook, laptop) computer, as well as devices such as a mobile telephone, personal digital assistant, IP enabled video player. The client 110 typically includes a processor, a display device (or output to a display device), a local storage, such as a hard drive or flash memory device, to which the client 110 stores data used by the user in performing tasks, and a network interface for coupling to the system 100 via the network 130.

A client 110 also has a video player 120 (e.g., the Flash™ player from Adobe Systems, Inc., or a proprietary one) for playing a video stream. The video player 120 may be a standalone application, or a plug-in to another application such as a network browser. Where the client 110 is a general purpose device (e.g., a desktop computer, mobile phone), the player 120 is typically implemented as software executed by the computer. Where the client 110 is dedicated device (e.g., a dedicated video player), the player 120 may be implemented in hardware, or a combination of hardware and software. All of these implementations are functionally equivalent in regards to the present invention. The player 120 includes user interface controls (and corresponding application programming interfaces) for selecting a video feed, starting, stopping, and rewinding a video feed. Also, the player 120 can include in its user interface a video display format selection configured to indicate which video display format (e.g., a standard definition TV or a high-definition TV). Other types of user interface controls (e.g., buttons, keyboard controls) can be used as well to control the playback and video format selection functionality of the player 120.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100.

The video hosting service 100 comprises an adaptive transcoding system 102, a video server 104, an ingest server 106 and a video database 108. The ingest server 106 receives user uploaded videos and stores the videos in the video database 108. The video server 104 serves the videos from the video database 108 in response to user video hosting service requests. The video database 108 stores user uploaded videos and videos transcoded by the adaptive transcoding system 102. In one embodiment, the video database 108 stores a large video corpus (e.g., 20,000 user uploaded videos) for the adaptive transcoding system 102 to train rate-distortion modeling engines.

The adaptive transcoding system 102 comprises a video coding complexity engine 200, a video rate-distortion (R-D) modeling engine 400, an adaptive bitrate transcoding sub-system 600 and an adaptive resolution transcoding sub-system 800. For a source video, the video coding complexity engine 200 generates a measure of the coding complexity of the source video based on spatial and temporal features of the source video. The video rate-distortion modeling engine 400 generates a rate-distortion model and a scaling model from videos in a video corpus stored in the video database 108. The adaptive bitrate transcoding sub-system 600 transcodes a given source video with an optimized bitrate and visual quality based on the video coding complexity of the source video and the rate-distortion model. The adaptive resolution transcoding sub-system 800 transcodes the source video with an optimized resolution and visual quality based on the video coding complexity of the source video. As a beneficial result, each source video is transcoded to a video 180 that has an optimized visual quality, bit rate, and resolution.

Figure 1B:
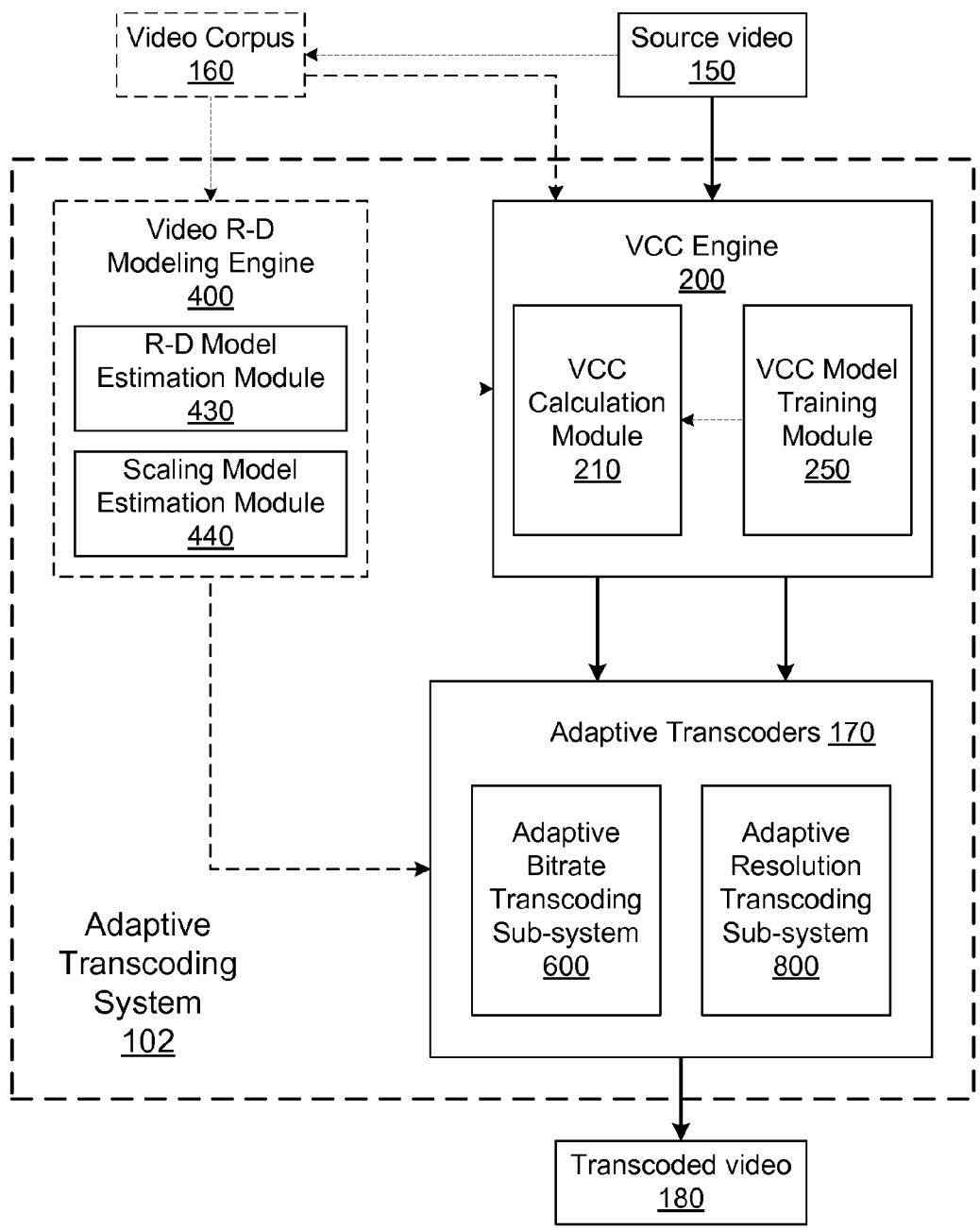
FIG. 1B is a flow diagram illustrating the adaptive transcoding system within the video hosting service illustrated in FIG. 1A.

To further illustrate the system operation of the video hosting service 100, FIG. 1B is a flow diagram illustrating of the adaptive transcoding system 102 within the video hosting service 100 illustrated in FIG. 1A. A user sends a request to the video hosting service 100 for uploading a source video 150. The adaptive transcoding system 102 receives the source video 150 in its native format and processes the source video 150 by the video coding complexity (VCC) engine 200. The source video 150 in its native format has a plurality video coding parameters including resolution, frame rate and bitrate. These plurality video coding parameters are referred to as "source video coding parameters."

In one embodiment, the VCC engine 200 comprises a VCC calculation module 210 and VCC model training module 250. The VCC calculation module 210 comprises an intermediate video encoder, a video feature extraction module and a VCC estimation module. The intermediate video encoder encodes the source video 150 into an intermediate video format. The VCC estimation module generates a measure of the video coding complexity of the source video 150. The VCC model training module 250 comprises a normalization module and a training module. The VCC model training module 250 may further comprise an intermediate video encoder and a video feature extraction module. The VCC model training module 250 trains a VCC model using videos selected from a video corpus 160. The VCC calculation module 210 generates the measure of the video coding complexity of the source video with reference to the trained VCC model. The VCC engine 200 sends the plurality of source video coding parameters, such as, resolution, frame rate and content header information of the source video 150, and the estimated video coding complexity measurement to adaptive transcoders 170 for further processing. The VCC engine 200 is further described in FIGS. 2A, 2B, 2C and 3.

The source video 150 can be also stored in a video database and becomes a part of the video corpus 160 stored in the video database. The video corpus 160 is processed by the video R-D modeling engine 400. In one embodiment, the video R-D modeling engine 400 comprises a R-D model estimation module 430 and a scaling model estimation module 440. The video R-D modeling engine 400 trains the video corpus 160 off-line using the R-D model estimation module 430 and the scaling model estimation module 440 to generate a rate-distortion model and a scaling model from videos in the video corpus 160. The video R-D modeling engine 400 is further described in FIGS. 4 and 5.

The adaptive transcoders 170 in one embodiment comprises the adaptive bitrate transcoding sub-system 600 and the adaptive resolution transcoding sub-system 800 illustrated in FIG. 1A. The adaptive bitrate transcoding sub-system 600 communicates with the VCC engine 220 to obtain the video coding complexity and one or more video coding parameters of the source video 150. The adaptive bitrate transcoding sub-system 600 applies the R-D model and scaling model obtained from the video R-D modeling engine 440 to the source video and generates an optimal bitrate for the source video 150 based on the video coding complexity of the source video 150. The adaptive bitrate transcoding sub-system 600 transcodes the source video 150 with the optimal bitrate and visual quality. The adaptive bitrate transcoding sub-system 600 is further described in FIGS. 6 and 7.

The adaptive resolution transcoding sub-system 800 communicates with the VCC engine 220 to obtain the video coding complexity and one or more video coding parameters of the source video 150. The adaptive resolution transcoding sub-system 800 estimates an optimal output resolution for the source video 150 based on the video coding complexity of the source video 150, and transcodes the source video 150 with the optimal output resolution and visual quality. The optimal output resolution represents the most suitable resolution to transcode the source video based on its coding parameters such as content complexity and its native resolution. The adaptive resolution transcoding sub-system 800 is further described in FIGS. 8-11. Other embodiments of the adaptive transcoders 170 may comprise additional transcoding sub-systems.

II. Video Coding Complexity Measurement

Varying contents in scenes captured by video sequences lead to various amount of information contained in the video sequences. Given a large video corpus of a video hosting service, coding each video with same target resolution and video frame rate does not necessarily produce acceptable video quality in every case. Applying same coding bitrate to different video content leads to different video qualities. A coding bitrate being applied to a particular video sequence cannot accurately represent average bitrate of the video corpus. Furthermore, ignoring the impact of video content and coding complexity on transcoding a video sequence degrades the visual quality of the transcode video and user experience. To transcode a source video with acceptable video quality needs effectively evaluates the video coding complexity of the source video.

Figure 2A:
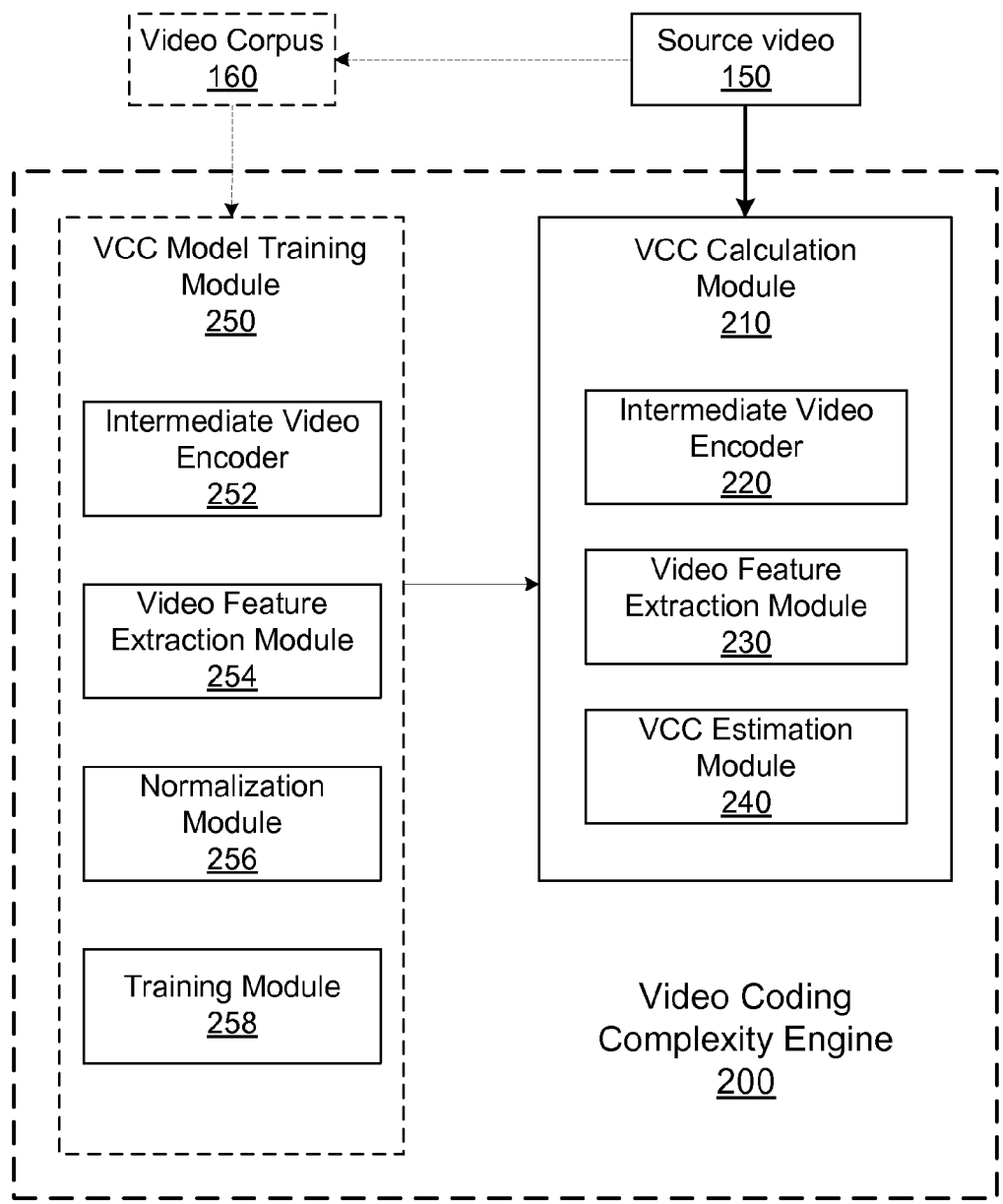
FIG. 2A is a flow diagram illustrating a video coding complexity engine of an adaptive transcoding system.

FIG. 2A is a flow diagram illustrating a video coding complexity engine 200 of an adaptive transcoding system. The VCC engine 200 comprises a VCC calculation module 210 and a VCC model training module 250. The VCC calculation module 210 is configured to receive a source video 150 and calculates a measure of the coding complexity of the source video 150. The VCC model training module 250 is configured to train a VCC model using a set of videos selected from the video corpus 160. The VCC model training module 250 can train the VCC model off-line and train the VCC model based on request. The VCC calculation module 210 calculates a measure of the coding complexity of for each source video 150 based on the trained VCC model. The VCC calculation module 210 is described below with reference to FIG. 2B, and the VCC model training module 250 is described with reference to FIG. 2C.

Figure 2B:
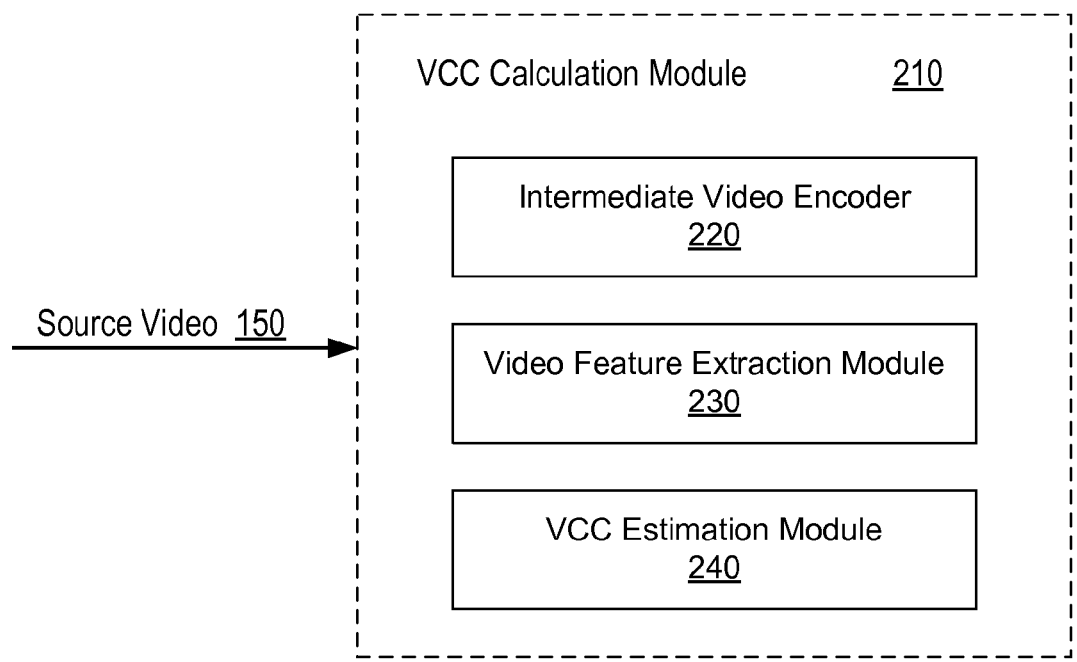
FIG. 2B is a video coding complexity calculation module of a video coding complexity engine.

FIG. 2B illustrates a video coding complexity (VCC) calculation module 210 of the video coding complexity engine 200. The VCC calculation module 210 comprises an intermediate video encoder 220, a video feature extraction module 230 and a video coding complexity (VCC) estimation module 240. The video coding complexity engine 200 is configured to receive a source video 150 and generate a measure of the coding complexity of the source video 150. The coding complexity measure of the source video 210 represents the difficulty to encode the source video 150.

The intermediate video encoder 220 is configured to encode the source video 150 from its native format into an intermediate format at a high target encoding bitrate (e.g., 20 magabits per second for a 640×360 video sequence). To encode the source video 150 into an intermediate format allows the VCC calculation module 210 to easily extract the spatial and temporal features from the source video and the extracted spatial and temporal features from the source video closely represent the amount of spatial and temporal (e.g., motion) information contained in the source video 150. The VCC calculation module 210 uses the extracted features to measure the coding complexity of the source video 150.

To simplify the description of the intermediate video encoder 220, the input video 150 in its native format is referred to as the "original source video" and the encoded input video in the intermediate video format is referred to as "encoded source video". The intermediate format may be same as the native format or different from the native format. Practically, the intermediate video encoder 220 is allocated some number of coding bits as needed to encode the source video 150 such that the encoded source video is close to lossless video quality. The encoding process by the intermediate video encoder 220 creates a log file that stores the coding information of each video frame of the encoded source video.

For example, the VCC calculation module 210 receives a source video 150 having a Moving Picture Experts Group (MPEG) 2 as its native format. The intermediate video encoder 220 is a flash video encoder, and the flash video encoder encodes the source video 150 from its native format (e.g., MPEG-2) to an intermediate format (e.g., H.263) using a video encoding program (e.g., FFmpeg). The encoding process by the flash video encoder creates an FFmpeg log file for the encoded source video. Other video encoders can be used as the intermediate video encoder 220.

The coding information in the log file created by the intermediate video encoder 220 may include the information about the spatial and temporal features and/or other information of each frame of the encoded source video. Using the same example above, the FFmpeg log file of the encoded source video may include the following parameters to represent the information of a video frame of the encoded source video:

display_picture_number: picture number of the video frame in display order;

qp: quantization parameter of the video frame;

header_bits: number of bits to encode the header of the video frame;

mv_bits: number of bits to code motion vectors of the video frame;

mc_mb_var_sum: sum of variance of motion-compensated macroblock (MB) residual over the video frame;

mb_var_sum: sum of variance of original source MB over the video frame;

i_tex_bits: number of bits to encode an intra macroblock texture;

p_tex_bits: number of bits to encode a predictive macroblock texture;

i_count: number of intra macroblocks of the video frame;

skip_count: number of skipped macroblocks of the video frame.

Variations in the spatial and temporal characteristics of source videos lead to different coding complexity of the source videos. In one embodiment, the video coding complexity of a source video is proportional to the amount of spatial and temporal (e.g., motion) information contained in the source video. The video feature extraction module 230 extracts one or more spatial and temporal features of the source video from the log file created by the intermediate video encoder 220. Extracted spatial features of a video frame characterize the amount of spatial activity of the video frame. In one embodiment, the video feature extraction module 230 extracts the variance of each MB's luminance value of a source video frame averaged over an entire intra frame, and extracts the variance of each MB's motion-compensated luminance residual over the entire motion-compensated P- or B-frame. The larger the luminance variance/motion-compensated luminance residual becomes, the larger the spatial activity is contained in the video frame.

Using the FFmpeg log file described above as an example, the extracted spatial feature for a video frame is represented by "mb_var_sum" parameter in the FFmpeg log file. For a motion-compensated frame, the extracted spatial feature is represented by "mc_mb_var_sum" parameter which indicates the energy of the motion-compensated luminance residual over the entire video frame.

Extracted temporal features of a video frame, such as the length/entropy of motion vectors and energy of frame residual, represent the amount of motion present in the video frame. Practically, MBs of a video frame are encoded differently from each other depending on how much motion a MB contains and how much similarity the MB has with the MBs in reference frame(s). A macroblock with zero motion and very low motion prediction errors can be skipped. For a macroblock with high motion prediction errors, the macroblock is best encoded in an intra mode. Other macroblocks between being skipped and being encoded in an intra mode can be encoded as P or B type of macroblocks. In one embodiment, the video feature extraction module 230 records information from the encoding process, including number of bit to encode motion vectors, number of bits to encode an intra macroblock texture, number of bits to encode a predictive macroblock texture (e.g., P type macroblocks), number of intra macroblocks and number of skipped macroblocks of a video frame as the temporal features.

Using the FFmpeg log file described above as an example, the extracted temporal features include "mv_bits" (for number of bits to encode motion vectors), "i_tex_bits" (for number of bits to encode an intra macroblock texture), "p_tex_bits" (for number of bits to encode a predictive macroblock), "i_count" (for number of intra macroblocks) and "skip_count" (for number of skipped macroblocks of a video frame).

The VCC estimation module 240 generates a measure of the coding complexity of the source video 150 using the spatial and/or temporal features extracted by the video feature extraction module 230. The measure of the coding complexity of the source video 150 represents a measure of how complicated it is to encode the entire source video 150. The spatial and temporal features extracted by the video feature extraction module 230 represent the spatial and temporal activity of the source video frame at frame level. In one embodiment, to measure the coding complexity of the entire source video, the VCC estimation module 240 selects a subset of the extracted features from each encoded source frame (e.g., frame-level features) and transfers the selected sub-set of frame-level features into features for the entire video sequence (e.g., sequence-level features). The VCC estimation module 240 processes the sequence-level features and computes a VCC score for the source video 150 based on the processed sequence-level features.

Generally, the more bits needed to encode a source video, the more complicated the source video is. In other words, a higher bitrate of the encoded source video indicates a more complex video being encoded. To effectively represent the overall coding complexity of the source video, the extracted features selected to compute the VCC score of the source video should have a high correlation with the bitrate of the encoded source video. In one embodiment, a model training module 250 of the VCC engine 200 can perform an off-line correlation analysis using the videos in the video corpus 160 illustrated in FIG. 1B. Based on the correlation analysis from encoding the videos in the video corpus 160, the VCC estimation module 240 selects frame-level spatial variance, residual energy, number of skipped macroblocks and number of bits to encode the motion vector of a predictive MB of the source video 150 to compute the VCC score. The off-line correlation analysis by the VCC model training module 250 is described below with reference to FIG. 2C.

To transfer the frame-level spatial and temporal features into the sequence-level ones, the VCC estimation module 240 calculates mean spatial variance, mean residual energy, percentage of skipped macroblocks and average bits to encode the motion vector of a predictive MB of the source video 150 using the following equations:

$$\mathrm{mean\_spatial\_variance\_per\_frame} = \frac{\mathrm{mb\_var\_sum}}{\mathrm{mb\_num}} \quad (1)$$

where mb_var_sum is the sum of variance of original source macroblock over current frame being processed, and mb_num is the total number of macroblocks of the current frame;

$$\mathrm{mean\_spatial\_variance} = \frac{\sum_{i=0}^{k} \mathrm{mean\_spatial\_variance\_per\_frame}(i)}{k} \quad (2)$$

where k is the total number of frames of the source video 150;

$$\mathrm{mean\_residual\_energy\_per\_frame} = \frac{\mathrm{mc\_mb\_var\_sum}}{\mathrm{mb\_num}} \quad (3)$$

where mc_mb_var_sum is the sum of variance of motion-compensated macroblock residual over current frame being processed;

$$\text{mean\_residual\_energy} = \frac{\sum_{i=0}^{k} \text{mean\_residual\_energy\_per\_frame}(i)}{k}; \quad (4)$$

$$\text{percentage\_skip\_mb} = \frac{\sum_{i=0}^{k} \text{skip\_count}(i)}{k * \text{mb\_num}}; \quad (5)$$

where skip_count(i) is the number of skipped macroblocks of i-th frame;

$$\text{mean\_mv\_bits} = \frac{\sum_{i=0}^{j} \text{mv\_bits}(i)}{j * \text{mb\_num}} \quad (6)$$

where j is the total number of P- or B-frames of the source video 150, and mv_bits(i) is the number to encode motion vectors of i-th P- or B-frame.

The VCC estimation module 240 processes the sequence-level spatial and/or temporal features for generating the coding complexity score of the source video 150. As a source video can be potentially transcoded into various resolutions and frame rates, the coding complexity of the source video is computed at a predetermined reference resolution and frame rate in order to represent the complexity of the video content of the source video. In one embodiment, the VCC estimation module 240 normalizes the sequence-level spatial and temporal features using 320×240 pixels as the predetermined reference resolution and 29.97 frames per second (fps) as the reference frame rate. In practice, the VCC estimation module 240 may simply normalize the sequence-level spatial and temporal features based on the reference frame rate because different resolutions do not cause significant changes to the sequence-level spatial and temporal features calculated by the equations (1) to (6) above.

For example, given a frame rate of the source video 150, fps(source), and the reference frames rate of 29.97 fps, the VCC estimation module 240 normalizes the mean number of bits to encode the motion vectors of the source video 150 using the following equation:

normalized_mean_mv_bits=mean_mv_bits* fps(source)/29.97. (7)

The VCC estimation module 240 also normalizes texture energy of the source video 150 using the reference frame rate. The texture energy of the source video 150 represents the spatial activity of the source video 150 and can be represented by the mean_spatial_variance calculated by equation (2) above or the mean_residual_energy calculated by equation (4) above. Given a frame rate of the source video 150, fps (source), and the reference frames rate of 29.97 fps, the VCC estimation module 240 normalizes the texture energy of the source video 150 as following:

normalized_texture_energy_spatial= mean_spatial_variance*fps(source)/29.97; (8a)

normalized_texture_energy_residual= mean_residual_energy*fps(source)/29.97. (8b)

To keep the coding complexity estimation process efficient, such as linear computing time of complexity estimation, the VCC estimation module 240 applies a log function (e.g., $\log_{10}$) to the normalized texture energy and generates scaled texture energy. To further limit the scaled texture energy to be within a maximum threshold, the VCC estimation module 240 applies a clip function (e.g., clip_T, where T is the maximum threshold value) to the scaled texture energy. The clip function sets the value of the scaled texture energy to its original values if the scaled texture energy is smaller or equal to the maximum threshold value T, otherwise, the clip function set the value of the scaled texture energy to T.

The spatial activity of the source video 150 can be represented by the normalized_texture_energy_residual or the normalized_texture_energy_spatial of the source video 150. The VCC estimation module 240 classifies the encoding mode of the source video 150 into two modes: inter-dominant mode and intra-dominant mode. The encoding mode classification is based on the comparison between normalized_texture_energy_residual and the normalized_texture_energy_spatial of the source video 150. Responsive to the normalized_texture_energy_spatial is larger than normalized_texture_energy_residual, the encoding mode of the source video 150 is classified as inter-dominant mode, otherwise, the encoding mode of the source video 150 is classified as intra-dominant mode.

Responsive to the source video 150 being encoded into the intermediate video format in inter-dominant mode, the VCC estimation module 240 computes the VCC score of the source video 150 using the following equation (9a):

vcc_score inter=$\alpha_1$+$\alpha_2$*clip_$T_1$($\log_{10}$(normalized_ texture_energy_residual+1))+$\alpha_3$*clip_ $T_2$(normalized_mean_mv_bits)+ $\alpha_4$*percentag_skip_mb;

where $\alpha_1$, $\alpha_2$, $\alpha_3$, $\alpha_4$, $T_1$, $T_2$ are predetermined threshold values, clip_$T_1$ is the clip_T function for the normalized_texture_energy_residual and clip_$T_2$ is the clip_T function for the normalized_mean_mv_bits. In one embodiment, $T_1$=3, $T_2$=6, $\alpha_1$=0.037626, $\alpha_2$=0.21391, $\alpha_3$=0.048981, $\alpha_4$=−0.17014 and $\alpha_1$, $\alpha_2$, $\alpha_3$, $\alpha_4$ are obtained through an off-line training process on the video corpus 160 illustrated in FIG. 1B by the VCC engine 200.

Responsive to the source video 150 being encoded into the intermediate video format in intra-dominant mode, the VCC estimation module 240 computes the VCC score of the source video 150 using the following equation (9b):

vcc_score_intra=$\beta_1$+$\beta_2$*clip_$T_3$($\log_{10}$(normalized_ texture_energy_spatial+1))+$\beta_3$*clip_ $T_4$(normalized_mean_mv_bits)+ $\beta_4$*percentag_skip_mb where $\beta_1$, $\beta_2$, $\beta_3$, $\beta_4$, $T_3$, $T_4$ are predetermined threshold values and clip_$T_3$ is the clip_$T_4$ function for the normalized_texture_energy_spatial. In one embodiment, $T_3$=3.3, $T_4$=6 $\beta_1$=0.036164, $\beta_2$=0.1964, $\beta_3$=0.037997, $\beta_4$=−0.39205 and $\beta_1$, $\beta_2$, $\beta_3$, $\beta_4$ are obtained through an off-line training process on the video corpus 160 illustrated in FIG. 1B by the VCC engine 200.

Figure 2C:
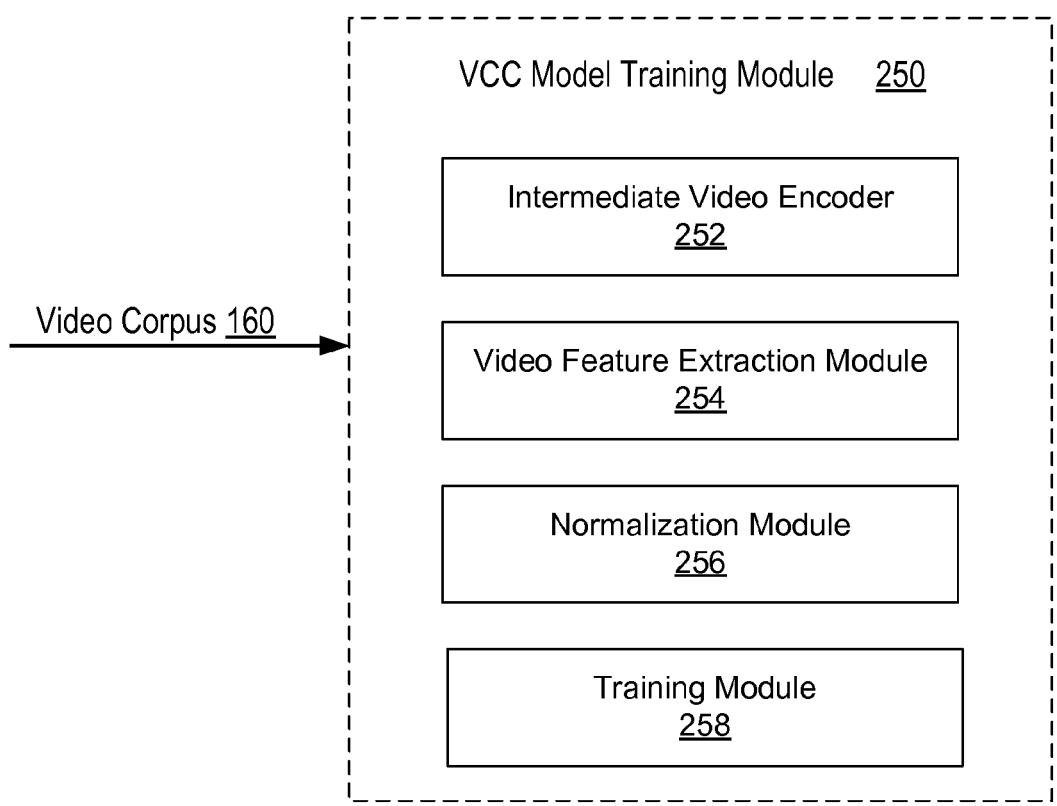
FIG. 2C is a video coding complexity model training module of a video coding complexity engine.

To effectively represent the overall coding complexity of a source video, the extracted features from the source video selected to compute the VCC score of the source video should have a high correlation with the bitrate of the encoded source video. For example, the VCC engine 200 can encode videos in the video corpus 160 and analyze the correlations between each of the spatial and temporal features of the encoded videos in the video corpus and their corresponding bitrates. FIG. 2C illustrates a VCC model training module 250 of the video coding complexity engine 200. The VCC model training module 250 is configured to select a video set, such as 20,000 videos, from the video corpus 160 and to train a VCC model using a linear regression algorithm. The VCC model training module 250 comprises an intermediate video encoder 252, a video feature extraction module 254, a normalization module 256 and a training module 258.

The intermediate video encoder 252 is similar as the video encoder 220 of FIG. 2B, but encodes the source video into an output video at a reference resolution (e.g., 320×240) and a reference frame rate (e.g., 29.97 fps). The video feature extraction module 254 is similar as video feature extraction module 230 of FIG. 2B. The normalization module 256 receives the encoding bitrate of a video encoded by the intermediate video encoder 252 and normalizes the encoding bitrate to a predetermined range. For example, the predetermined range of the normalization is between a numeric zero and one. The normalized bitrate by the normalization module is used by the training module 258 to approximate the VCC score of a source video calculated by the VCC calculation module 210.

The training module 258 receives video features extracted by the video feature extraction module 254 and the normalized bitrate by the normalization module for a video encoded by the intermediate video encoder 252. In one embodiment, a linear regression algorithm is used to model the relationship between the selected video feature and the normalized bitrate. For example, the training module 258 uses the "regress" function provided by MatLab software. The result from the training module 258 is a trained VCC model that is used by the VCC calculation module 210 to calculate the VCC score of a given source video.

Figure 3:
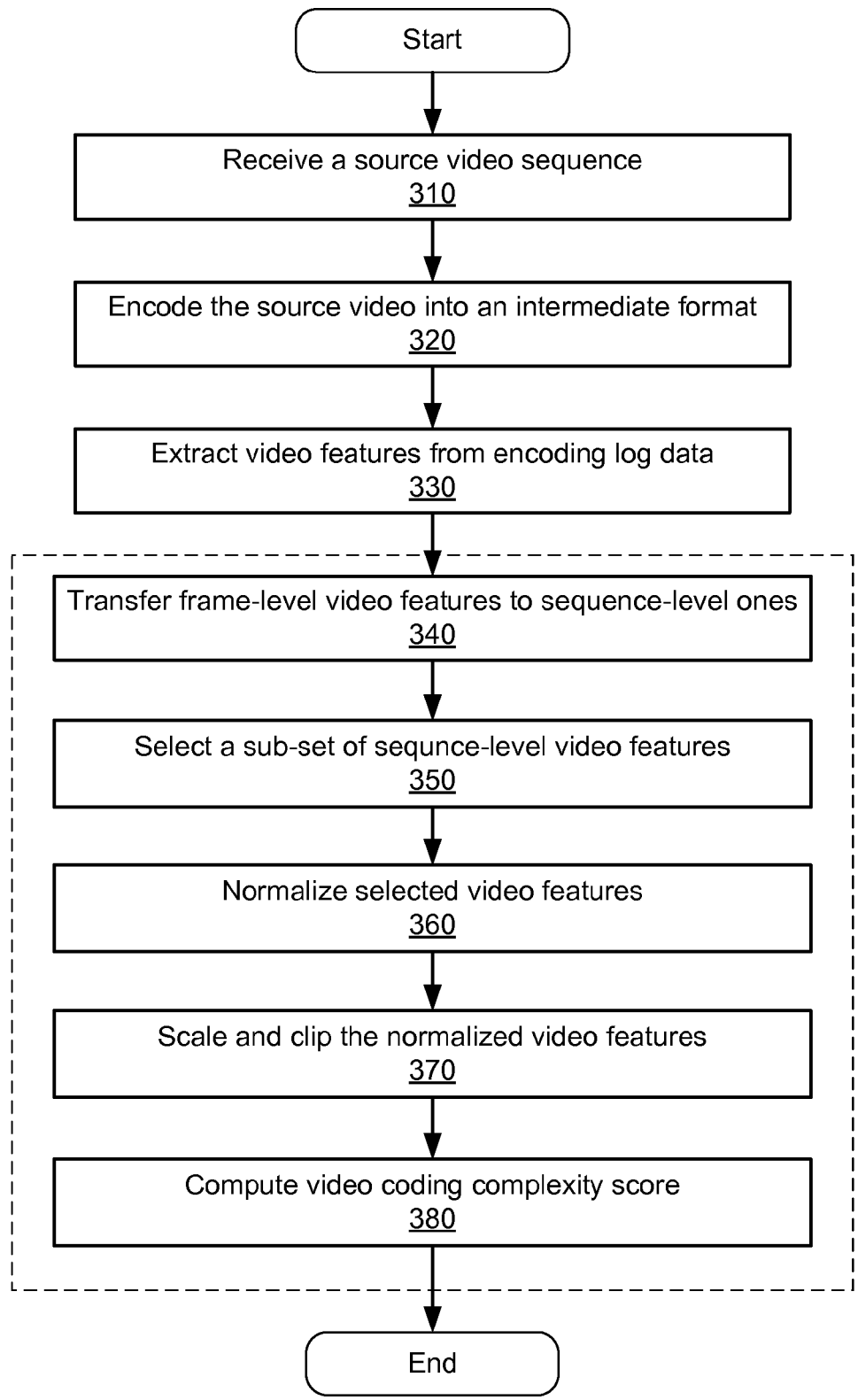
FIG. 3 is a flow chart of estimating video coding complexity of a source video using the video coding complexity engine illustrated in FIG. 2.

Turning now to FIG. 3, FIG. 3 is a flow chart of estimating video coding complexity of a source video using the video coding complexity engine 200 illustrated in FIG. 2. Initially, the video coding complexity engine 200 receives 310 a source video in a native video format (e.g., MPEG-2) and encodes 320 the source video by the intermediate video encoder 220 into an intermediate video format (e.g., H.263). The intermediate video encoder 220 also creates a log file to store the coding information of each video frame of the encoded source video and/or the video coding parameters of the original source video. The video feature extraction module 230 reads the log file and extracts 330 frame-level spatial and/or temporal features from the encoded source video. The VCC estimation module 240 transfers 340 the frame-level video features to sequence-level features. The VCC estimation module 240 selects 350 a sub-set of sequence-level video features to be used for the VCC score calculation. The VCC estimation module 240 further normalizes 360 the selected video features based on a references resolution (e.g., 320×240 pixels) and/or a reference frame rate (e.g., 29.97 fps). To keep the VCC score estimation process efficient and bounded within a predetermined maximum threshold, the VCC estimation module 240 scales and clips 370 the normalized video features. Finally, the VCC score estimation module 240 computes 380 the video coding complexity score based on a determination of encoding mode classification (e.g., inter-dominant or intra-dominant). The computed VCC score of the source video is used by other modules of the adaptive transcoding system 102 for transcoding the source video.

III. VCC-Based Rate-Distortion Modeling

One challenge in designing an effective adaptive transcoding system for a large video corpus with millions of video containing various contents, is to efficiently distribute bits among the videos in the video corpus within an acceptable cost limit. Given a target resolution and frame rate, a video's encoding quality is determined by its bitrate. However, as the coding complexity of each video in a large video corpus is very likely to be different from each other, the same bitrate applied to the videos in the video corpus leads to different encoding quality of the videos. To optimize the average encoding quality of the video corpus under a total egress bandwidth constraint (e.g., the average bitrate of the video corpus), the adaptive transcoding system 102 is configured to determine the target bitrate of each video in the video corpus using statistical learning and modeling on the video corpus based upon the use of a video coding complexity metric, such as VCC.

Figure 4:
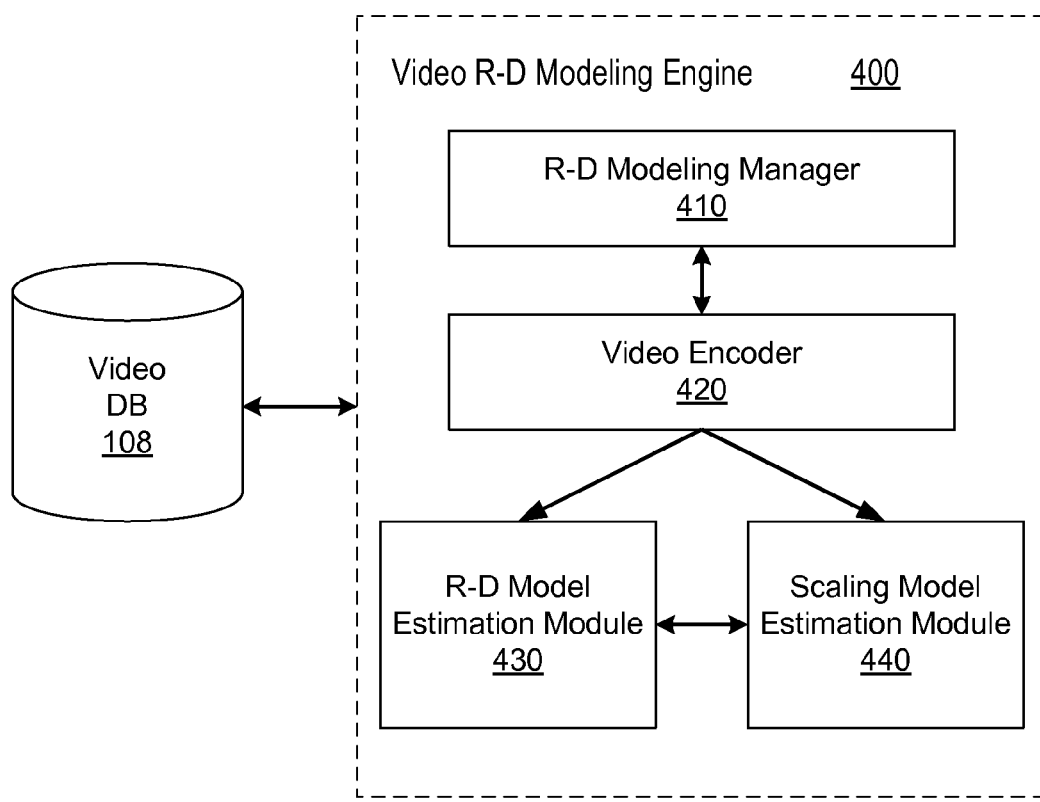
FIG. 4 is a video R-D modeling engine of an adaptive transcoding system.
Figure 5:
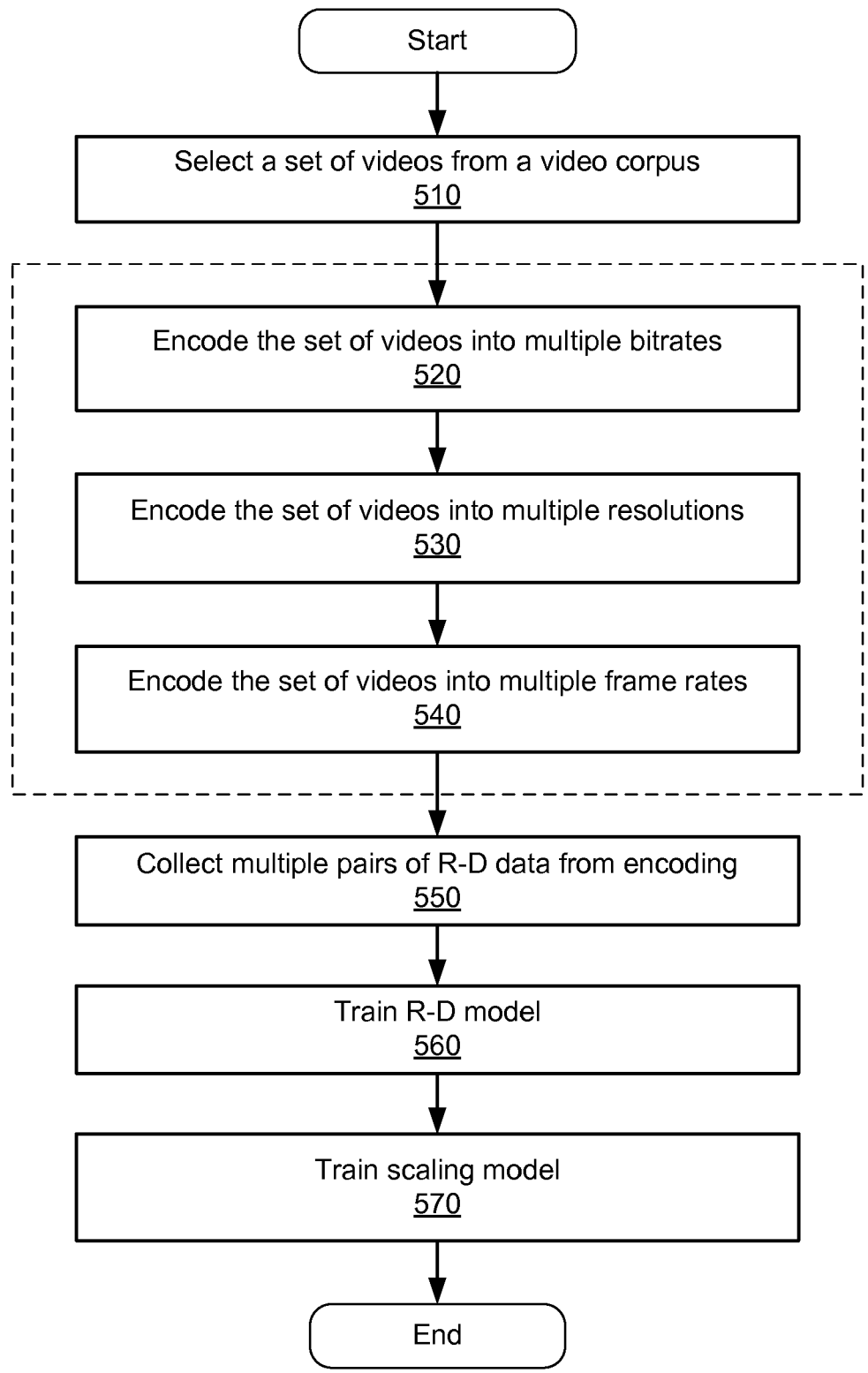
FIG. 5 is a flow chart of training an R-D model and scaling model using the video R-D modeling engine illustrated in FIG. 4.

FIG. 5 is a flow chart of training an R-D model and scaling model using the video R-D modeling engine 400 to be illustrated in FIG. 4. The R-D modeling manager 410 of the video R-D modeling engine 400 selects 510 a set of videos from a video corpus. The video encoder 420 of the video R-D modeling engine 400 encodes 520 each of the set of videos into multiple bitrates, encodes 530 the set of video into multiple resolutions, or encodes 540 the set of videos into multiple frame rates. The video encoder 420 collects multiple pairs of rate-distortion data from each encoded video. Using the collected rate-distortion data, the video R-D modeling engine 400 trains 560 the R-D model and estimates the scaling model 570.

FIG. 4 is a video R-D modeling engine 400 of the adaptive transcoding system 102 illustrated in FIGS. 1A and 1B. The video R-D modeling engine 400 comprises a R-D modeling manager 410, a video encoder 420, a R-D model estimation module 430 and a scaling model estimation module 440. The video R-D modeling engine 400 uses the videos corpus stored in the video database 108 to train the R-D model estimation module 430 and the scaling model estimation module 440. In one embodiment, the video R-D modeling engine 400 estimates a R-D model and scaling model off-line with the video corpus stored in the video database 108.

The R-D modeling manager 410 randomly selects a video set, for example, 20,000 videos, from the video corpus stored in the video database 108 and provides the selected video set to the video encoder 420. The video encoder 420 encodes each of the video in the selected video set into multiple different versions at multiple different bitrates, resolutions or frame rates. For each encoded video, the video encoder 420 collects multiple coding parameters (e.g., quantization step size) and multiple pairs of rate-distortion data corresponding to a bitrate, resolution or frame rate. The collected rate-distortion data are sent by the video encoder 420 to train the R-D model estimation module 430 and the scaling model estimation module 440. In one embodiment, the video encoder 420 is a H.264 video encoder. Other video codecs known to those of ordinary skills in the art are readily available for encoding the selected video set.

Given a source video, a pair of rate-distortion data defines a trade-off between minimizing the bitrate of the encoded video and keeping the distortion in the reconstructed (i.e., encoded and decoded) video small. The distortion measures the difference between the reconstructed video and the original source video. For example, assuming that the source video follows Laplacian distribution, the distortion measure of a pixel of the source video D can be defined as $D(x-x')=abs(x-x')$, where x is a pixel of the source video, x' is the reconstructed pixel of the original pixel x, and $abs(x-x')$ is the absolute difference between the reconstructed pixel x' and the original pixel x.

The bitrate of a video being encoded is defined as the average number of bits used to represent the length of the video for a second. The bitrate required to encode a video into a pre-defined quality depends on both the video content complexity of the video and the sampling characteristics (e.g., resolutions and frame rates) of the video. The pre-defined quality of a video can be established by the peak-signal-to-noise-ratio (PSNR) of the reconstructed video. A higher PSNR of a video indicates a better quality of the reconstructed source video. However, a particular value of PSNR of a video does not necessarily equate to an "absolute" subjective quality of the reconstructed video. Alternatively, quantization parameter, such as quantization step size, of a video is often used by various video codecs to define the quality of the reconstructed video. A quantizer maps a signal of the source video with a range of values to a quantized signal with a reduced range of values.

Given a target resolution and frame rate of a video, the tradeoff between distortion and rate in coding the video can be represented by a rate-distortion function R(D). The rate distortion function R(D) specifies the lowest bitrate at which a video can be encoded while keeping the distortion less than or equal to D. For example, assuming that the video follows Laplacian distribution, the distortion measure of the video D being defined as D(x−x')=abs(x−x'), a closed-form solution for the R(D) function is:

$$R(D)=\ln(1/aD), \quad (10)$$

where a is a pre-determined constant. Expanded to a Taylor series, the R(D) function of equation (10) for encoding a single unit, such as a frame or a MB of the video, becomes:

$$R(D)=a_1/D+a_2/D^2+\ldots \quad (11)$$

The R(D) function of equation (11) modified in terms of quantization step size and absolute difference between the video and the reconstructed video is defined by the following equation:

$$R(Q)=a_1*s/Q+a_2*s/Q^2+h, \quad (13)$$

where Q is the quantization step size for each frame of the video, s is the predicted mean absolute difference between a frame or MB of the video and the frame or MB of the reconstructed video, h denotes the bits used to encode header and motion vectors of each frame of the video.

To estimate the bitrate to encode an entire source video based on the video coding complexity of the source video, the R(D) function of equation (13) is modified to include the video coding complexity as follows:

$$R(Q',VCC)=(a/Q'+b)*VCC, \quad (14)$$

where Q' is the average quantization step size across the encoded output of the source video, VCC indicates the video coding complexity of the source video, and a the b are pre-determined modeling parameters. Compared with s of the R(D) function of equation (13) for coding complexity of a frame or MB of the source video, VCC of the R(Q',VCC) function of equation (14) captures the coding complexity of the source video. Further, rate R of equation (14) to encode a source video is linearly proportional to the video coding complexity of the whole source video and inversely proportional to the averaged quantization step size of the source video. In other words, more bits are required to encode a more complicated source video and more bits are required to encode a source video with a smaller quantization step size.

For example, a source video is encoded using a H.264 codec with H.264 main profile as the compression algorithm using the R(D) function of equation (14). For each frame of the video, the quantization step size Q is calculated as $Q=0.25*2^{qp/6}$, where qp is the quantization parameter defined in the H.264 coding standard. The average quantization step size of the entire video Q' is the quantization step size Q of each frame of the video averaged over the entire video. VCC is the coding complexity score of the video calculated by the video coding complexity engine 200 illustrated in FIG. 2. The pre-determined R-D model parameters a and b are a=2238.79 and b=193.33 in one embodiment.

The R-D model estimation module 430 uses the multiple pairs of rate-distortion data corresponding to a bitrate, resolution or frame rate collected by the video encoder 420 to train a R-D model at a reference resolution and reference frame rate. Specifically, the R-D model estimation module 430 uses a multi-variance linear regression algorithm to train the R-D model given in equation (14) above to estimate the model parameters a and b. In one embodiment, the multi-variance linear regression algorithm is ordinary least squares (OLS) algorithm. Other embodiments may use other multi-variance linear regression algorithms.

Similarly, the scaling model estimation module 440 uses the multiple pairs of rate-distortion data corresponding to a bitrate, resolution or frame rate collected by the video encoder 420 to train a scaling model that scales the bitrate from encoding at a reference resolution/reference frame rate to a different target resolution/frame rate. One or more modeling parameters for the scaling model are obtained through the training described below.

The scaling model estimation module 440 communicates with the R-D model estimation module 430 to scale the bitrates calculated by the R-D model estimation module 430 with a reference resolution and/or frame rate to a different target resolution and/or frame rate. In one embodiment, the reference resolution is 320×240 pixels, and the reference frame rate is 29.97 fps. Other embodiments can use other reference resolutions and/or reference frame rates.

Given a reference bitrate, reference_bitrate, calculated by the R-D model estimation module 430, a reference resolution, reference_resolution, and a target resolution of the transcoded video, target_resolution, the scaling model estimation module 440 scales the reference bitrate to obtain a scaled bitrate for the source video as follows:

$$\text{resolution\_ratio}=\text{target\_resolution}/\text{reference\_resolution} \quad (15a)$$

$$\text{bitrate(resolution)}=\text{reference\_bitrate}*\text{resolution\_ratio}^c, \quad (15b)$$

where c is a modeling parameter and c=0.7.

Similarly, given a reference frame rate, reference_fps and an output frame rate of the transcoded video, target_fps, the scaling model estimation module 440 scales the reference bitrate to obtain a scaled bitrate for the source video as follows:

$$\text{fps\_ratio}=\text{target\_fps}/\text{reference\_fps} \quad (16a)$$

$$\text{bitrate(fps)}=\text{reference\_bitrate}*(\alpha_1/(\text{fps\_ratio}*\text{fps\_ratio})+\alpha_2/\text{fps\_ratio}+\alpha_3) \quad (16b)$$

where $\alpha_1$, $\alpha_2$, $\alpha_3$ are modeling parameters obtained through the training of the scaling model estimation module 440. In one embodiment, $\alpha_1=-0.0164$, $\alpha_2=-0.0182$, $\alpha_3=1.0330$.

IV. Adaptive Bitrate Transcoding Sub-System

Figure 6:
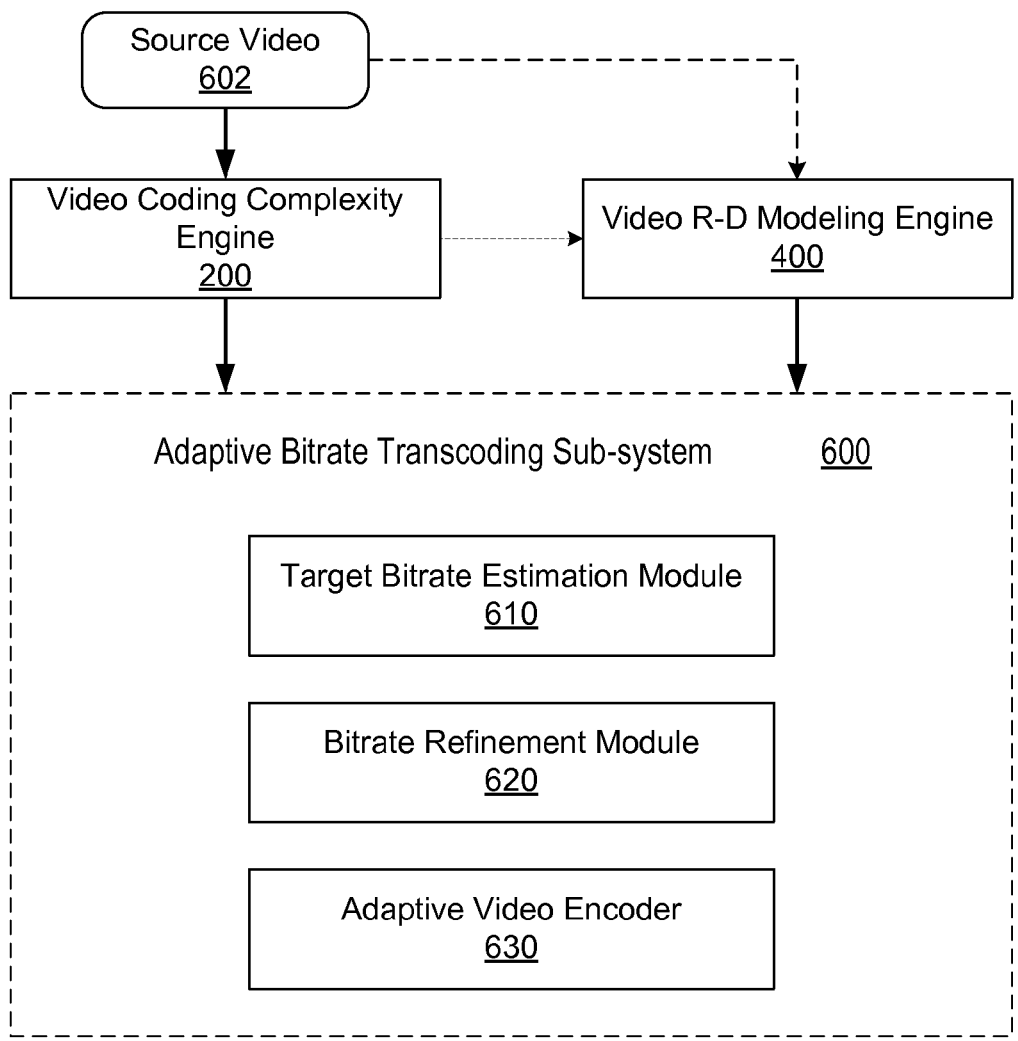
FIG. 6 is block diagram of an adaptive bitrate transcoding sub-system of an adaptive transcoding system.

FIG. 6 is block diagram of an adaptive bitrate transcoding sub-system 600 of the adaptive transcoding system 102 illustrated in FIGS. 1A and 1B. The adaptive bitrate transcoding sub-system 600 transcodes a source video 602 with an optimized bitrate and visual quality based on the video coding complexity of the source video 602 and a R-D model and a scaling model. The adaptive bitrate transcoding sub-system 600 is configured to receive the source video 602 and to obtain the video coding complexity score of the source video 602. The adaptive bitrate transcoding sub-system 600 is also configured to receive multiple predetermined target coding parameters for the source video 602, including target quantization step size, resolution and frame rate, of the source video 602. The adaptive bitrate transcoding sub-system 600 calculates an initial target bitrate of the source video 602 based on the video coding complexity score and the target quantization step size of the source video 602 using the R-D model trained by the rate-distortion modeling engine 400. The adaptive bitrate transcoding sub-system 600 refines the calculated initial target bitrate with respect to the target resolution and/or the target frame rate of the source video 602. The target resolution of the source video 602 is the output resolution of the transcoded video of the source video 602. Similarly, the target frame rate of the source video 602 is the output frame rate of the transcoded video of the source video 602. The adaptive bitrate transcoding sub-system 600 transcodes the source video using the refined initial target bitrate.

In one embodiment, the adaptive bitrate transcoding sub-system 600 comprises a target bitrate estimation module 610, a bitrate refinement module 620 and an adaptive video encoder 630. The adaptive bitrate transcoding sub-system 600 communicates with the video coding complexity engine 200 and the video R-D modeling engine 400. The video coding complexity engine 200 computes the video coding complexity score of the source video 602. For example, the video coding complexity engine 200 encodes the source video 602 into an intermediate video format and extracts a plurality of frame-level spatial and/or temporal features (e.g., sum of variance of intra frames and motion-compensated frames) from a log file created from encoding the source video 602. The video coding complexity engine 400 further transfers the frame-level spatial and/or temporal features to sequence-level ones using equations such as (1)-(6). Depending on which encoding mode (e.g., inter-dominant or intra-dominant) is used to encode the source video, the video coding complexity engine 400 computes the video coding complexity score of the source video 602 using equation (9a) or (9b).

The video R-D modeling engine 400 provides a trained R-D model and a scaling model for the source video 602 to the adaptive bitrate transcoding sub-system 600. The R-D model and the scaling model are trained over multiple sets of videos selected from a large video corpus by the video R-D modeling engine 400. For example, the video R-D modeling engine 400 provides a R-D model defined by the R(D) function of equation (14) $R(Q',VCC)=(a/Q'+b)*VCC$, where the coding constants a and b are obtained through the model training and a=2238.79 and b=193.33. The video R-D modeling engine 400 also provides a scaling model defined by the equations (15a-b) and (16a-b). The target coding parameters, such as target quantization step size, frame rate and resolution, of the source video 602 to the adaptive bitrate transcoding sub-system 600, in one embodiment, are design parameters. Frame rate and resolution can also be adaptively adjusted using an adaptive resolution transcoding subsystem, such as the subsystem 800 in FIG. 1A.

The target bitrate estimation module 610 receives the video complexity score of the source video 602 from the video coding complexity engine 200 and/or the target quantization step size of the source video 602 from the video R-D modeling engine 400 and computes the initial target bitrate $R_{init}$ using the equation (14) as follows:

$$R_{init}(Q',VCC)=(a/Q'+b)*VCC,$$

where the coding constants a=2238.79 and b=193.33, VCC is the video coding complexity score of the source video 602 and Q' is the target quantization step size of the source video 602.

The bitrate refinement module 620 refines the initial target bitrate $R_{init}$ by scaling the initial target bitrate $R_{init}$ with respect to the target resolution of the source video 602 and a reference resolution using the equations (15a-b) as follows:

$$\text{resolution\_ratio}=\text{target\_resolution/reference\_resolution}$$

$$R'_{init}(\text{resolution})=R_{init}*\text{resolution\_ratio}^{0.7}$$

where target_resolution is the output (or target) resolution of the source video 602 after transcoding and the reference_resolution is 320×240 pixels.

Similarly, the bitrate refinement module 620 refines the initial target bitrate $R_{init}$ by scaling the initial target bitrate $R_{init}$ with respect to the target frame rate of the source video 602 and a reference frame rate using the equations (16a-b) as follows: as follows:

$$\text{fps\_ratio}=\text{target\_fps/reference\_fps}$$

$$R'_{init}(\text{fps})=R_{init}*(\alpha_1/(\text{fps\_ratio}*\text{fps\_ratio})+\alpha_2/\text{fps\_ratio}+\alpha_3)$$

where $\alpha_1, \alpha_2, \alpha_3$ are scaling constants and $\alpha_1=-0.0164, \alpha_2=-0.0182, \alpha_3=1.0330$. target-fps is the output frame rate of the source video 602 after transcoding and the reference_fps is 29.97 fps.

The bitrate refinement module 620 can refine the initial target bitrate sequentially with both target resolution and frame rate of the source video 602. In one embodiment, the bitrate refinement module 620 refines the initial target bitrate first with the target resolution of the source video 602 followed by the target frame rate of the source video 602. In another embodiment, the bitrate refinement module 620 refines the initial target bitrate first with the target frame rate of the source video 602 followed by the target resolution of the source video 602. The adaptive video encoder 630 receives the refined initial bitrate from the bitrate refinement module 620 and encodes the source video 602 using the refined initial bitrate.

Figure 7:
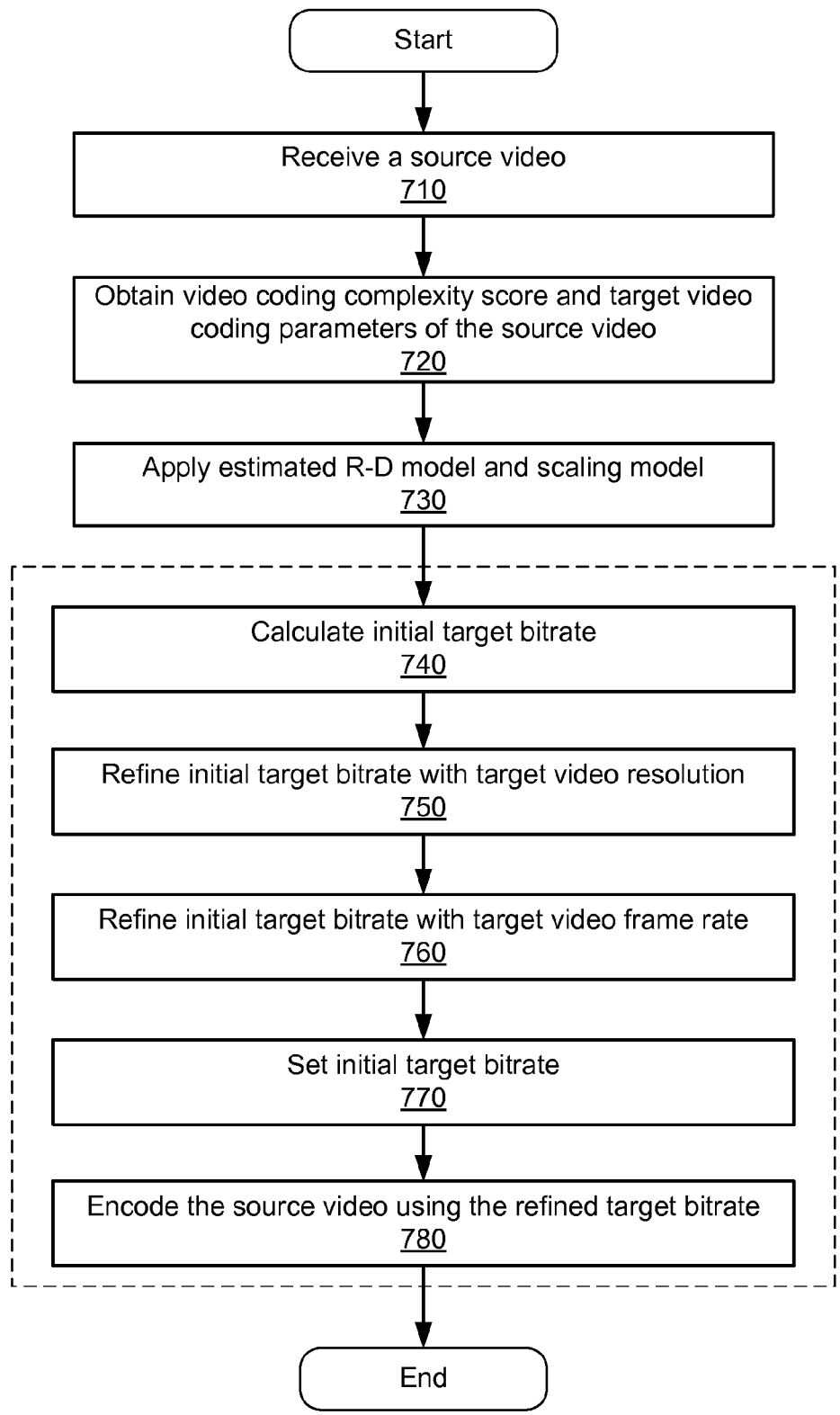
FIG. 7 is a flow chart of adaptively setting an optimal bitrate of a source video using the adaptive bitrate transcoding sub-system illustrated in FIG. 6.

FIG. 7 is a flow chart of adaptively setting an optimal bitrate of a source video using the adaptive bitrate transcoding sub-system 600 illustrated in FIG. 6. Initially, the adaptive bitrate transcoding sub-system 600 receives 710 a source video, and obtains 720 the video coding complexity score and one or more target coding parameters (e.g., target quantization step size, frame rate and resolution) of the source video. The adaptive transcoding sub-system 600 applies 730 a R-D model and a scaling model obtained from the video R-D modeling engine 400 to the source video. The adaptive transcoding sub-system 600 calculates 740 an initial target bitrate of the source video based on the video coding complexity score and the target quantization step size using the obtained R-D model. The adaptive transcoding sub-system 600 refines 750 the initial target bit rate with respect to the target resolution of the transcoded source video. The adaptive bitrate transcoding sub-system 600 also refines 760 the initial target bitrate with respect to the target frame rate of the transcoded source video. The adaptive transcoding sub-system 600 sets 770 the initial target bitrate of the source video to the refined initial target bitrate and encodes 780 the source video using the refined initial target bitrate. Other embodiments may perform the initial target bitrate refinements (steps 750 and 760) in a different order than the one described above.

V. Adaptive Resolution Transcoding Sub-System

Figure 8:
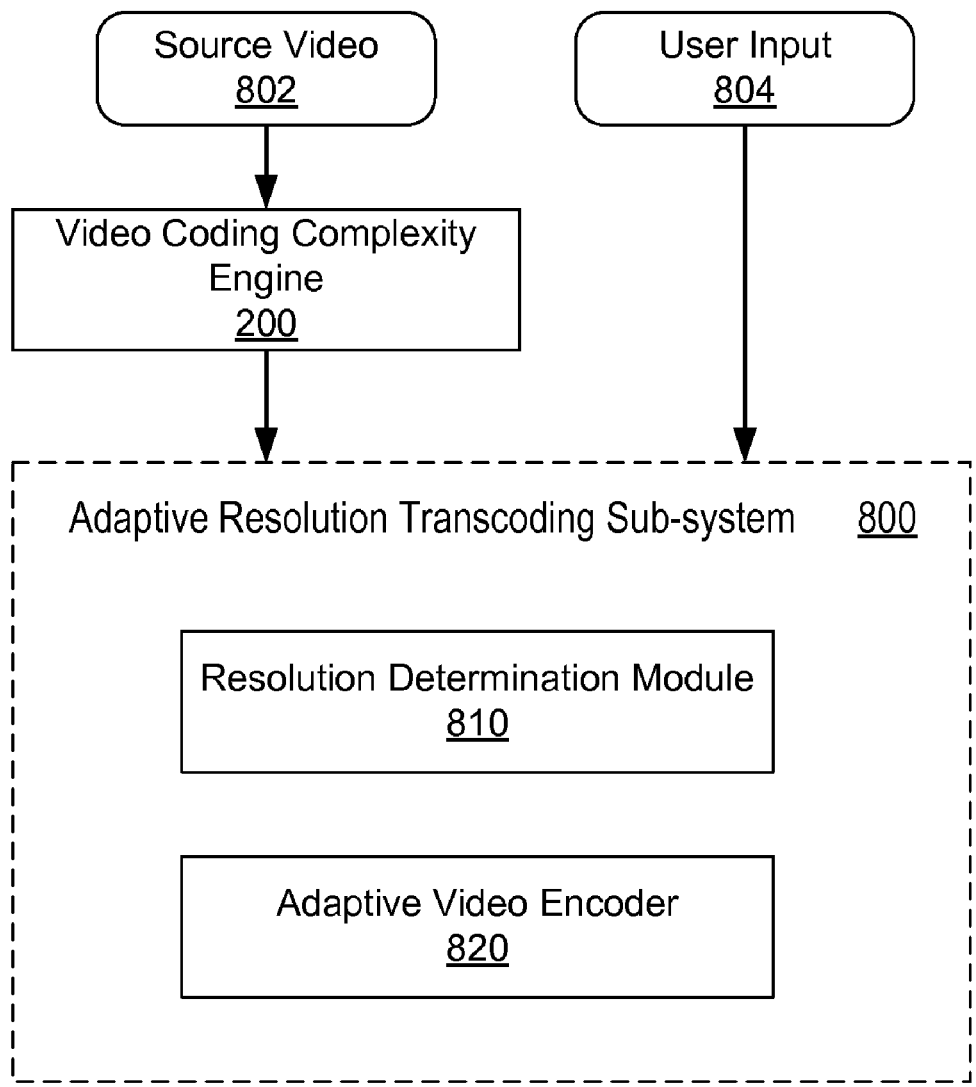
FIG. 8 is a block diagram of an adaptive resolution transcoding sub-system of an adaptive transcoding system.

FIG. 8 is a block diagram of an adaptive resolution transcoding sub-system 800 of the adaptive transcoding system 102 illustrated in FIGS. 1A and 1B. The adaptive resolution transcoding sub-system 800 transcodes a source video 802 with an optimized resolution and visual quality based on the video coding complexity of the source video 802. The adaptive resolution transcoding sub-system 800 is configured to receive the source video 802 in its native format. The adaptive resolution transcoding sub-system 800 obtains the video coding complexity score of the source video 802 and/or video coding parameters of the source video 802 from the video coding complexity engine 200. The video coding parameters include content header information of the source video 802 and the resolution of the source video 802 in its native format. The adaptive resolution transcoding sub-system 800 sets a resolution adjustment level based on the complexity score and content header information of the source video 802. Based on the resolution adjustment level, the adaptive resolution transcoding sub-system 800 determines an optimal resolution for the source video 802 and encodes the source video 802 with the determined optimal resolution. The optimal output resolution represents the most suitable resolution to transcode the source video based on its coding parameters such as content complexity and its native resolution. To simplify the description of the adaptive resolution transcoding sub-system 800, the resolution of the source video 802 in its native format is referred to as the original resolution of the source video 802.

In one embodiment, the adaptive resolution transcoding sub-system 800 comprises a resolution determination module 810 and an adaptive video encoder 820. The adaptive resolution transcoding sub-system 800 communicates with the video coding complexity engine 200. The resolution determination module 810 receives the video coding complexity score of the source video 802 and the content header information of the source video 802 from the video coding complexity engine 200. For each video output format supported by the adaptive resolution transcoding sub-system 800, the resolution determination module 810 sets a resolution adjustment level for the source video 802 based on the video coding complexity score and the content header information of the source video 802, and selects a resolution for the source video 802 from a predetermined list of resolutions based on the resolution adjustment level. The determination module 810 compares the selected resolution with the original resolution of the source video and determines the optimal resolution of the source video based on the comparison. The resolution determination module 810 further receives a user selection of a user input 804, such as user selection of a video output format of the source video 802, and selects the optimal resolution for the source video 802 based on the user selection and outputs the selected optimal resolution for the source video 802 to the adaptive video encoder 820. The adaptive video encoder 820 encodes the source video 802 with the received optimal resolution.

To further illustrate the functionality of the resolution determination module 810, the following pseudo-code represents one embodiment of setting the resolution adjustment level for a source video based on its video coding complexity and selects a resolution for the source video based on the resolution adjustment level:

```
//predetermined list of resolutions//static struct TargetVideoResolution {
int width;
int height;
} kTargetVideoResolution {
    {320, 240},
    {480, 360},
    {640, 480},
};
//setting resolution adjustment levels//
int TranscoderUtil::AdjustMaxTargetResoltion {
    float VCC;
    int32 video_output _format;
    int rLevel;
    switch (video_output _format) {
      case (contentHeader::FLV_h264_HQ):
        IF 0 ≦ VCC ≦ 0.2 {
          rLevel = 2;
            RETURN rLevel;
              }
        ELSE IF VCC ≦ 0.3 {
          rLevel =1;
          RETURN rLevel;
        }
        break;
          case (contentHeader::FLV_320_Normal):
        IF 0 ≦ VCC ≦ 0.1 {
          rLevel = 2;
          RETURN rLevel;
        }
        ELSE IF VCC ≦ 0.2 {
          rLevel =1;
          RETURN rLevel;
        }
        break;
        DEFAULT:
          Break;
          }
        rLevel =0;
        RETURN rLevel;
}
```

The parameter video_output_format represents one of the video output formats supported by the adaptive resolution transcoding sub-system 800, including high resolution and high quality video format such as high definition (HD of 1280×720 pixels resolution) and normal resolution and normal quality video format such as standard definition (SD of 640×480 pixels resolution). The parameter contentHeader contains the content header information of the source video. In the exemplary pseudo-code above, contentHeader can be FLV_h264_HQ corresponding to high resolution and high quality video output format, or FLV_320_Normal corresponding to default normal resolution and quality video output format. Threshold values (e.g., 0.1, 0.2 and 0.3) compared with the video coding complexity score above are predetermined. In one embodiment, the threshold values are obtained from experiments on a large video corpus of a video hosting service. The list of the target video resolutions, kTargetVideoResolution, is illustrated as an example. Higher resolutions, such as 720p (i.e., 1280×720 pixels, progressive), can also be included in the list.

For example, the resolution determination module 810 receives a source video having a video coding complexity score of 0.4, original resolution in its native format of 640×480 pixels and content header of contentHeader::FLV_320_Normal. The video coding complexity score of 0.4 indicates that there is relatively high complexity to encode the source video. The resolution determination module 810 sets the resolution adjustment level to level 0 based on the coding complexity score and the content header information, and selects the resolution of 320×240 pixels from the list of target resolutions based on the resolution adjustment level. The resolution determination module 810 compares the selected resolution (320×240 pixels) with the original resolution (640×480 pixels) of the source video, and sets the optimal resolution of the source video as the selected resolution (320× 240 pixels).

The resolution determination module 810 determines an optimal output resolution for a source video based on the native resolution, content header information and the VCC score of the source video. The optimal output resolution represents the most suitable resolution to transcode the source video based on its coding parameters such as content complexity and its native resolution. To further illustrate the resolution determination module 810, Table I lists some examples of the optimal output resolution for a source video in its native resolution from the resolution determination process.

TABLE I

Optimal Output Resolution

| Content Header of Source Video | VCC score | Source Video Native Resolution | Optimal Output Resolution |
|---|---|---|---|
| FLV_h264_HQ | 0 ≦ VCC ≦ 0.2 | {320, 240} | {320, 240} |
| | | {480, 360} | {480, 360} |
| | | {640, 480} | {640, 480} |
| | 0.2 < VCC ≦ 0.3 | {320, 240} | {320, 240} |
| | | {480, 360} | {480, 360} |
| | | {640, 480} | {480, 360} |
| FLV_320_Normal | 0 ≦ VCC ≦ 0.1 | {320, 240} | {320, 240} |
| | | {480, 360} | {480, 360} |
| | | {640, 480} | {640, 480} |
| | 0.1 < VCC ≦ 0.2 | {320, 240} | {320, 240} |
| | | {480, 360} | {480, 360} |
| | | {640, 480} | {480, 360} |
| Default | VCC | {320, 240} | {320, 240} |
| | | {480, 360} | {320, 240} |
| | | {640, 480} | {320, 240} |

To simplify an implementation of the adaptive resolution transcoding sub-system 800, a source video with original resolution in its native format that is lower than the optimal resolution determined by the resolution determination module 810 is encoded with its original resolution. For example, the resolution determination module 810 receives a source video having a video coding complexity score of 0.1, original resolution in its native format of 320×240 pixels and content header of contentHeader::FLV_h264_HQ. The video coding complexity score of 0.1 indicates that the source video has simple content, such as a talking head against a static background whiteboard. The resolution determination module 810 sets the resolution adjustment level to level 2 based on the coding complexity score and selects the resolution of 640× 480 pixels from the list of target resolutions based on the resolution adjustment level. The resolution determination module 810 compares the original resolution (e.g., 320×240 pixels) of the source video with the selected resolution (640× 480 pixels). The original resolution is lower than the selected resolution. The resolution determination module 810 sets the optimal resolution for the source video as the original resolution (320×240 pixels). The source video is encoded with its original resolution.

Figure 9:
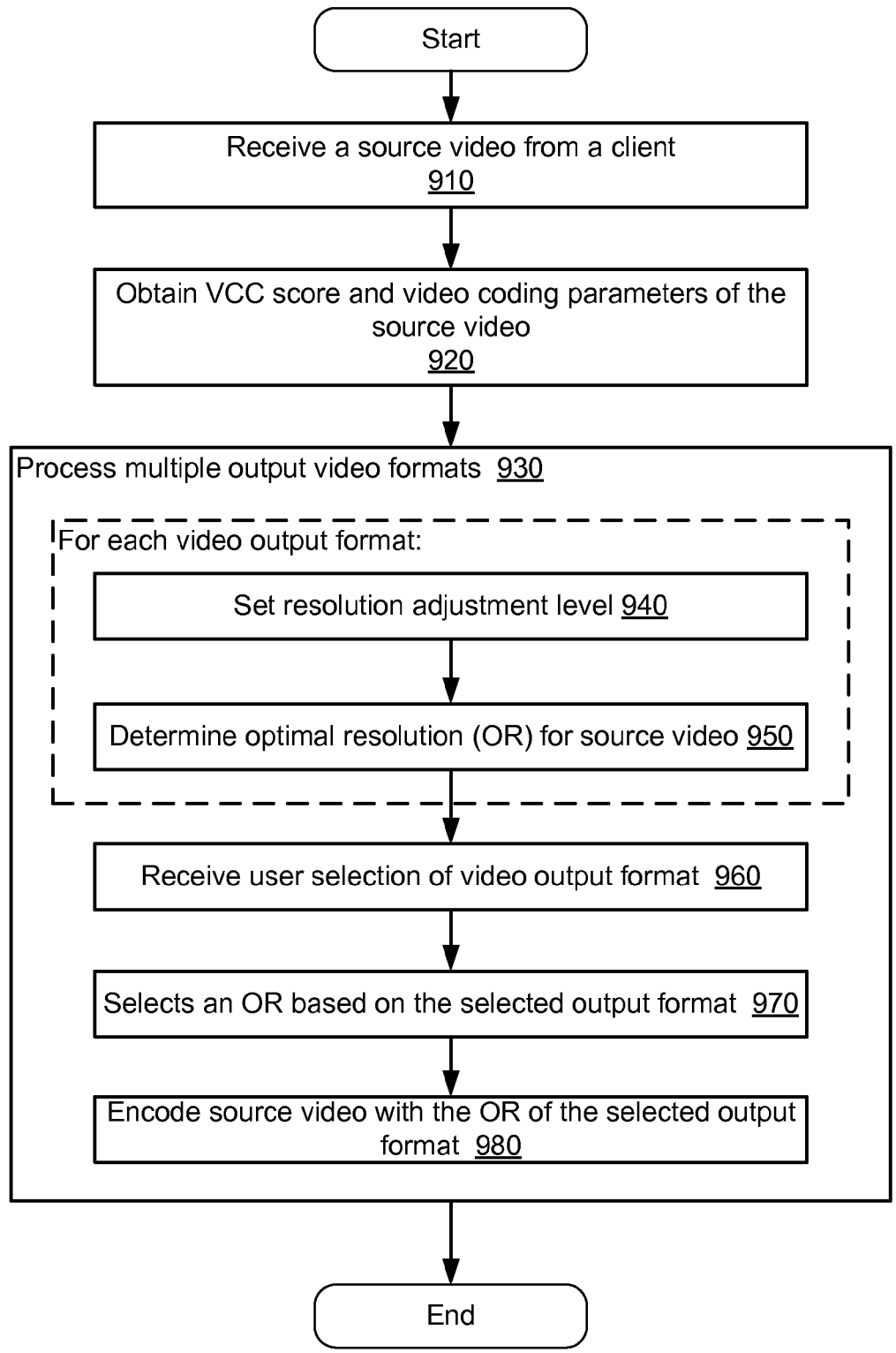
FIG. 9 is a flow chart of adaptively transcoding a source video for multiple video output formats using the adaptive resolution transcoding sub-system illustrated in FIG. 8.

FIG. 9 is a flow chart of adaptively transcoding a source video for multiple video output formats using the adaptive resolution transcoding sub-system 800 illustrated in FIG. 8. Initially, the adaptive resolution transcoding sub-system 800 receives 910 a resource video from a client, and obtains 920 the video coding complexity score and video coding parameters, such as the content header information and original resolution of the source video, from a video coding complexity engine 200. The adaptive resolution transcoding sub-system 800 processes 930 each of the multiple video output formats for the source video. Specifically, for each video output format, the resolution determination module 810 of the adaptive resolution transcoding sub-system 800 sets 940 a resolution adjustment level based on the video coding complexity score and content header information of the source video. The resolution determination module 810 determines 950 the optimal resolution for the source video. Responsive to receiving 960 a user selection of video output format, the resolution determination module 810 selects 970 an optimal resolution based on the user selection and provides the selected optimal resolution to the adaptive video encoder 820. The adaptive video encoder 820 encodes 980 the source video with the optimal resolution for the selected video output format.

Figure 10:
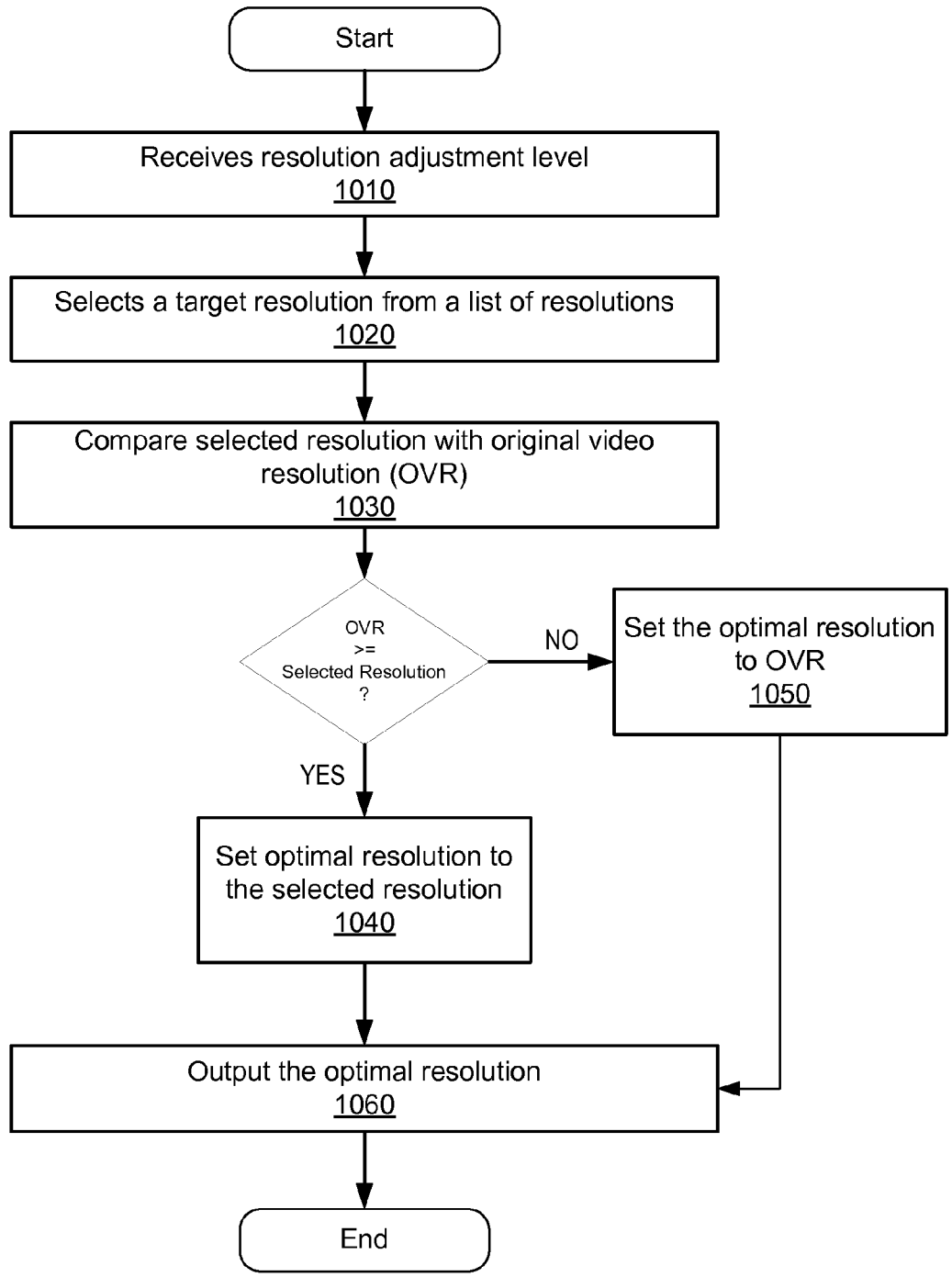
FIG. 10 is a flow chart of determining the optimal resolution of a source video.

FIG. 10 is a flow chart of the determination step 950 for determining the optimal resolution of a source video illustrated in FIG. 9. Initially, the resolution determination module 810 receives 1010 a resolution adjustment level and selects 1020 a target resolution for the source video from a list of target resolutions based on the received resolution adjustment level. The resolution determination module 810 compares 1030 the selected target resolution with the original resolution of the source video in its native format. Responsive to the original resolution of the source video is higher than the selected resolution, the resolution determination module 810 sets 1040 the optimal resolution of the source video to the selected resolution. Responsive to the original resolution of the source video is lower than the selected resolution, the resolution determination module 810 sets 1050 the optimal resolution of the source video to the original resolution of the source video. The resolution determination module 810 further outputs 1060 the optimal resolution to a video encoder to encode the source video with the optimal resolution.

Figure 11:
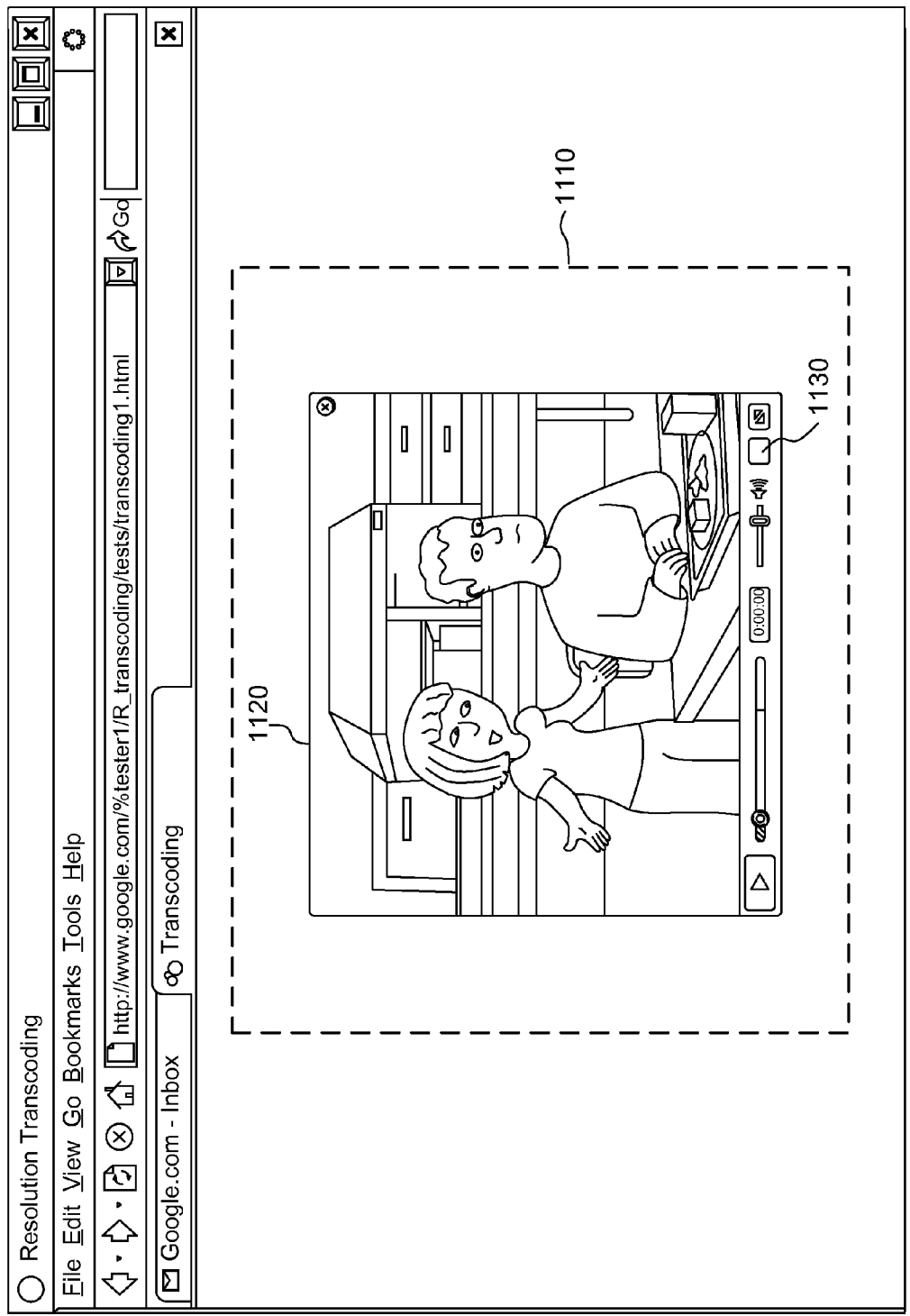
FIG. 11 is an exemplary display window to play a video encoded with an optimal resolution.

FIG. 11 is an exemplary display window 1110 to play a video encoded with an optimal resolution. The adaptive resolution transcoding sub-system 800 determines an optimal resolution for a source video received from a client for a use selected video output format, transcodes the source video with the optimal resolution and uploads the transcode video for display by the client. Upon receiving a transcoded video from the adaptive resolution transcoding sub-system 800, the client can choose a display window to play the transcoded video. The adaptive resolution transcoding sub-system 800 further scales the resolution of the transcoded video with respect to the display window 1110 based on a user selection. For example, the transcoded video with the optimal resolution is being played in a default display window 1120 that is configured to display the video in its optimal resolution. The client clicks a display window selection button 1130 to select a display window to display the transcoded video. The display window selections include full-screen display or default display. Responsive to full-screen display selection, the resolution of the transcoded video is scaled to fit the screen size constrained by the display window size 1110. Responsive to default display selection, the resolution of the transcoded video is not scaled and the transcoded video is displayed in the default display window 1120.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the, along with equivalent variations. In addition, the present invention is not described with primary to any particular programming language. It is appreciated that a variety of programming languages may be used to implement the teachings of the present invention as described herein, and any reference to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for computing video coding complexity of a source video for a video hosting service, the method comprising:
    training a video coding complexity model with a plurality of videos selected from a video corpus of the video hosting service, the video coding complexity model providing a video coding complexity score based upon features extracted from the selected videos encoded in an intermediate video format and normalized bit rates of the selected videos encoded in the intermediate format;
    receiving the source video, the source video having a first video format;
    encoding the source video into an intermediate video format;
    extracting video features from the encoded source video; and
    computing a video coding complexity score based on the extracted video features and the trained video coding complexity model.

2. The method of claim 1, wherein the video features comprise spatial and temporal video features of the source video at frame level.

3. The method of claim 2, wherein the spatial features of a frame of the source video represent the spatial activity of the frame.

4. The method of claim 3, wherein the spatial activity of the frame is represented by at least one of the variance of luminance value of each macroblock of the frame averaged over the entire frame, and the energy of motion-compensated luminance residual averaged over the entire frame.

5. The method of claim 2, wherein the temporal features of a frame of the source video represent the amount of motion in the frame.

6. The method of claim 5, wherein the amount of motion in the frame is represented by at least one of the entropy of motion vectors of the frame and the energy of frame residual.

7. The method of claim 1, wherein extracting video features from the encoded input video comprises transferring frame level video features into sequence level video features.

8. The method of claim 1, further comprises normalizing selected video features.

9. The method of claim 1, wherein training the video coding complexity model comprises using a linear regression scheme to analyze the relationship between extracted video features and normalized bitrates of the selected videos.

10. A computer system for computing video coding complexity of a source video for a video hosting service, the system comprising:

a video coding complexity model training module configured to:
  train a video coding complexity model using a plurality of videos selected from a video corpus of the video hosting service, the video coding complexity model providing a video coding complexity score based upon features extracted from the selected videos encoded in an intermediate video format and normalized bit rates of the selected videos encoded in the intermediate format; and
a video coding complexity calculation module configured to:
  receive the source video, the source video having a first video format;
  encode the source video into an intermediate video format;
  extract video features from the encoded source video; and
  compute a video coding complexity score based on the extracted video features and the trained video coding complexity model, the video coding complexity calculation module coupled with the video coding complexity training module.

11. The system of claim 10, wherein the video features comprise spatial and temporal video features of the source video at frame level.

12. The system of claim 11, wherein the spatial features of a frame of the source video represent the spatial activity of the frame.

13. The system of claim 12, wherein the spatial activity of the frame is represented by at least one of the variance of luminance value of each macroblock of the frame averaged over the entire frame, and the energy of motion-compensated luminance residual averaged over the entire frame.

14. The system of claim 11, wherein the temporal features of a frame of the source video represent the amount of motion in the frame.

15. The system of claim 14, wherein the amount of motion in the frame is represented by at least one of the entropy of motion vectors of the frame and the energy of frame residual.

16. The system of claim 10, wherein the video coding complexity calculation module is further configured to transfer frame level video features into sequence level video features.

17. The system of claim 10, wherein the video coding complexity calculation module is further configured to normalize selected video features.

18. The system of claim 10, wherein the video coding complexity model training module is further configured to analyze the relationship between extracted video features and normalized bitrates of the selected videos.

19. The system of claim 18, wherein the video coding complexity model training module is further configured to use a linear regression scheme to analyze the relationship between extracted video features and normalized bitrates of the selected videos.

20. A computer program product having a non-transitory computer-readable storage medium having executable computer program instructions recorded thereon for computing video coding complexity of a source video for a video hosting service, the computer program instructions configuring a computer system to comprise:
a video coding complexity model training module configured to:
  train a video coding complexity model using a plurality of videos selected from a video corpus of the video hosting service, the video coding complexity model providing a video coding complexity score based upon features extracted from the selected videos encoded in an intermediate video format and normalized bit rates of the selected videos encoded in the intermediate format; and
a video coding complexity calculation module configured to:
  receive the source video, the source video having a first video format;
  encode the source video into an intermediate video format;
  extract video features from the encoded source video; and
  compute a video coding complexity score based on the extracted video features and the trained video coding complexity model, the video coding complexity calculation module coupled with the video coding complexity training module.

* * * * *